(12) United States Patent
Kanamori et al.

(10) Patent No.: US 8,710,766 B2
(45) Date of Patent: Apr. 29, 2014

(54) LED DRIVING CIRCUIT, LED ILLUMINATION APPLIANCE, LED ILLUMINATOR, AND LED ILLUMINATION SYSTEM

(75) Inventors: Atsushi Kanamori, Osaka (JP); Hirohisa Warita, Osaka (JP); Takeshi Murata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 165 days.

(21) Appl. No.: 13/406,214

(22) Filed: Feb. 27, 2012

(65) Prior Publication Data

US 2012/0217900 A1 Aug. 30, 2012

(30) Foreign Application Priority Data

Feb. 28, 2011 (JP) ................. 2011-041421

(51) Int. Cl.
*H05B 37/00* (2006.01)
(52) U.S. Cl.
USPC ........... 315/297; 315/224; 315/225; 315/291; 315/307
(58) Field of Classification Search
USPC .......... 315/224, 225, 244, 291, 297, 307, 311
See application file for complete search history.

(56) References Cited

U.S. PATENT DOCUMENTS

| 8,258,706 | B2 | 9/2012 | Maruyama et al. | |
|---|---|---|---|---|
| 2010/0225251 | A1* | 9/2010 | Maruyama | 315/307 |
| 2010/0259185 | A1* | 10/2010 | Sadwick et al. | 315/291 |
| 2011/0018454 | A1* | 1/2011 | Melnyk | 315/224 |
| 2011/0095700 | A1 | 4/2011 | Kanamori et al. | |
| 2011/0156612 | A1 | 6/2011 | Kanamori et al. | |

FOREIGN PATENT DOCUMENTS

| JP | 2005-26142 A | 1/2005 |
|---|---|---|
| JP | 2006-319172 A | 11/2006 |
| JP | 2010-92776 A | 4/2010 |
| JP | 2010-212267 A | 9/2010 |
| JP | 2011-3467 A | 1/2011 |
| JP | 2011-90990 A | 5/2011 |
| JP | 2011-134672 A | 7/2011 |

\* cited by examiner

*Primary Examiner* — Douglas W Owens
*Assistant Examiner* — Thai Pham
(74) *Attorney, Agent, or Firm* — Birch, Stewart, Kolasch & Birch, LLP

(57) ABSTRACT

Provided is an LED driving circuit (4), including: an impedance detecting section (7) for detecting an impedance value of a phase-control type dimmer (2); and an impedance adjusting section (6) for adjusting an impedance of the LED driving circuit (4) based on the impedance value detected by the impedance detecting section (7).

12 Claims, 22 Drawing Sheets

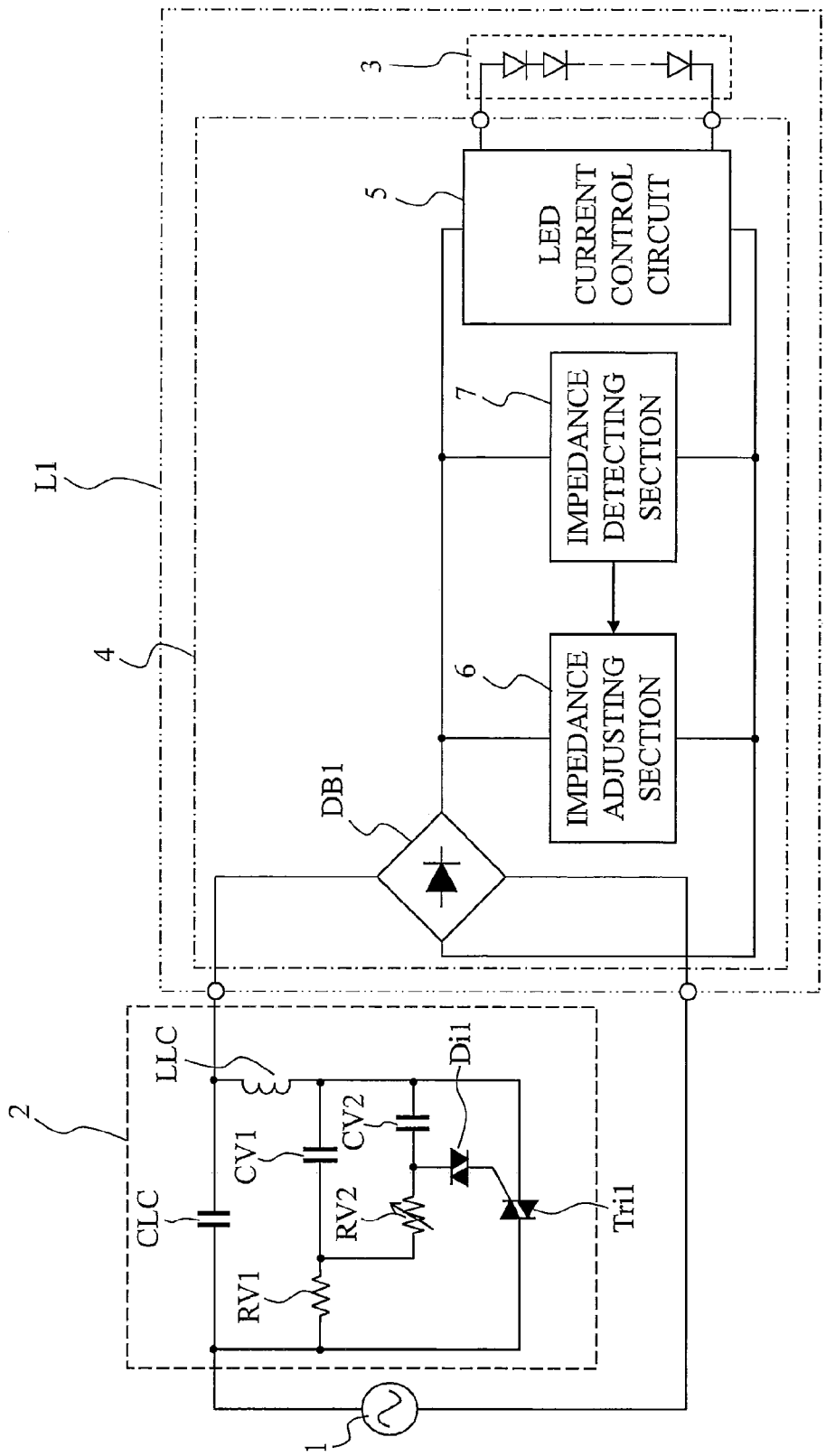

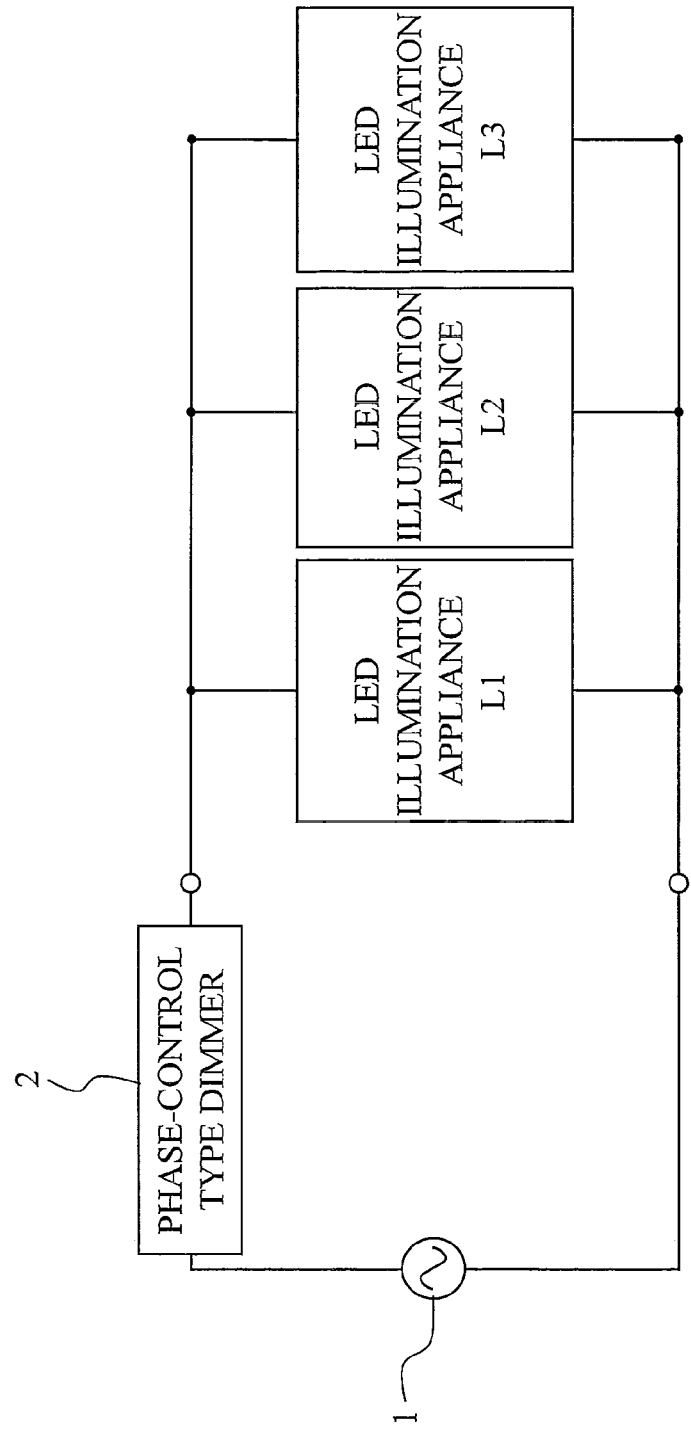

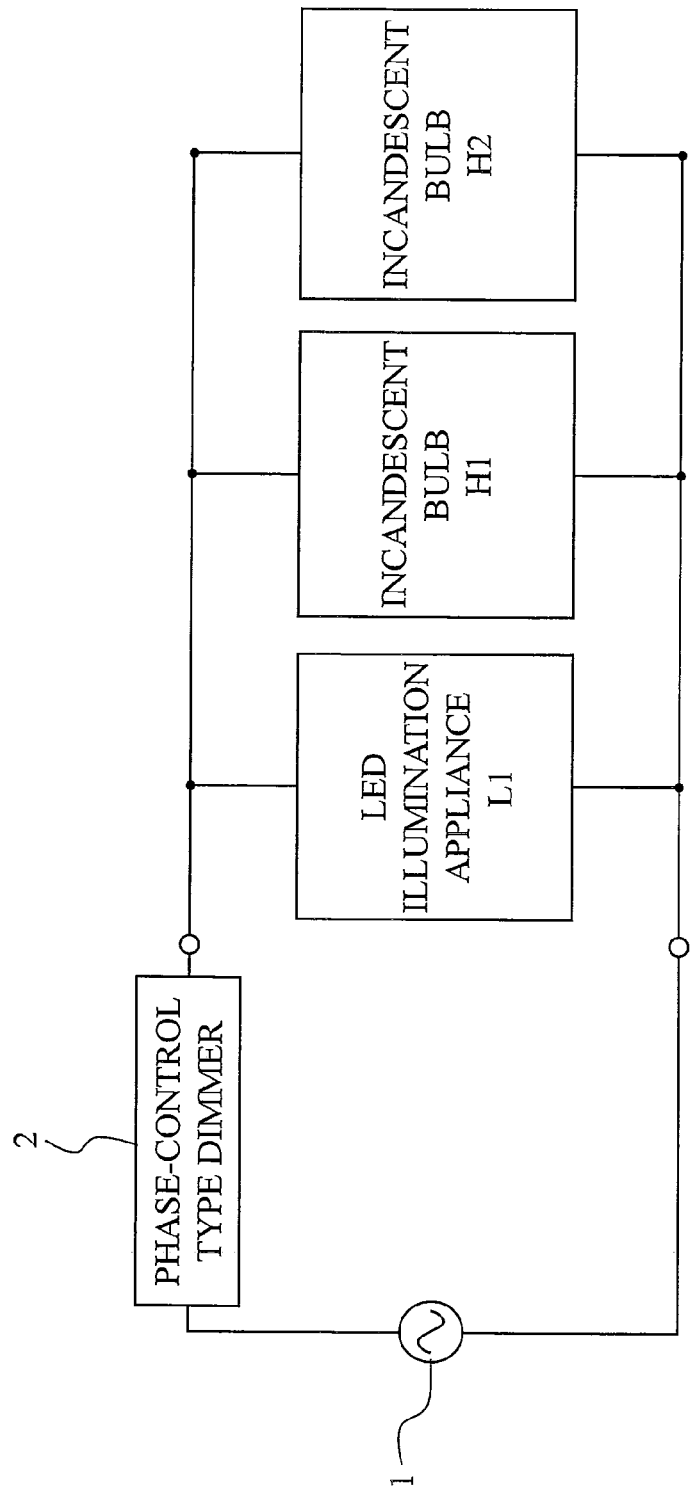

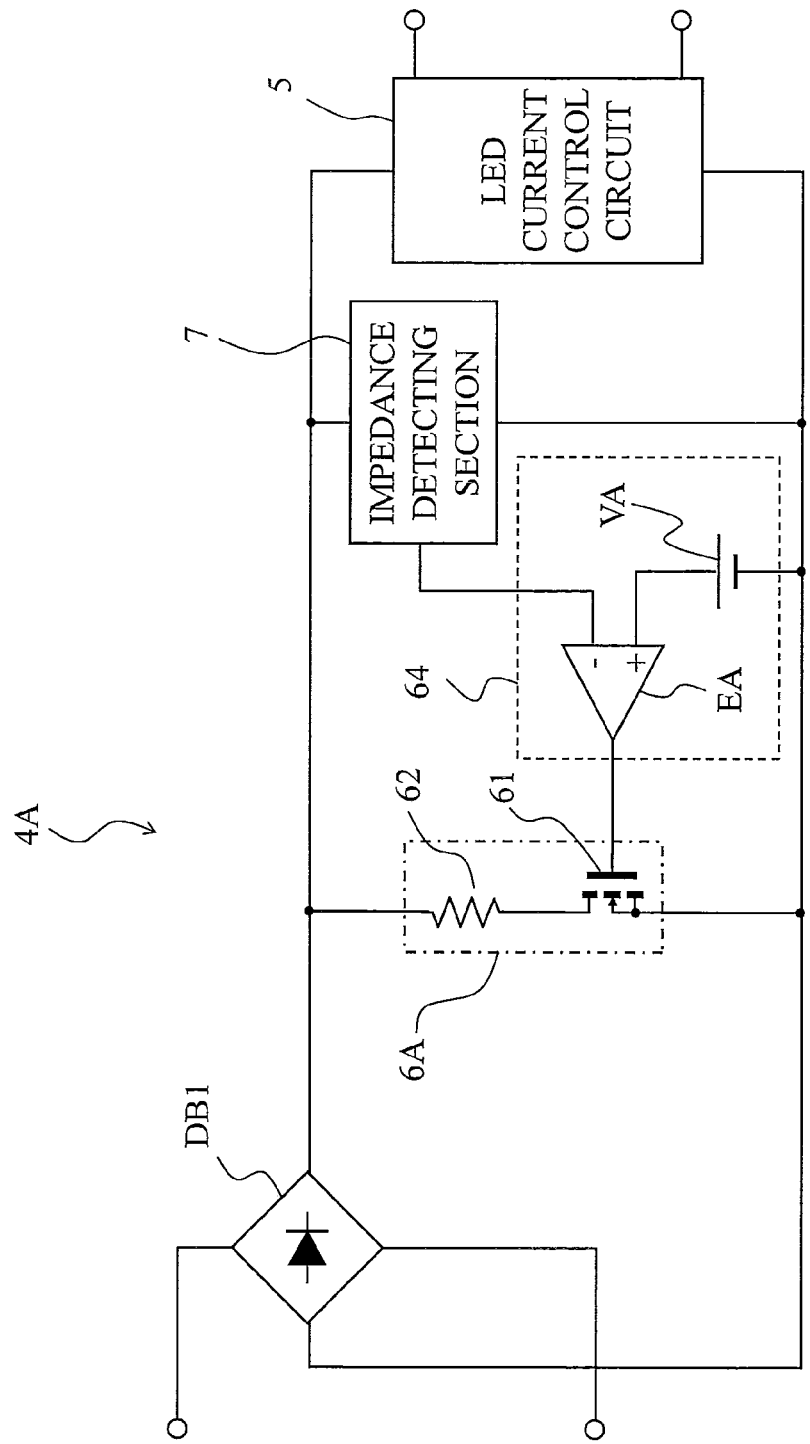

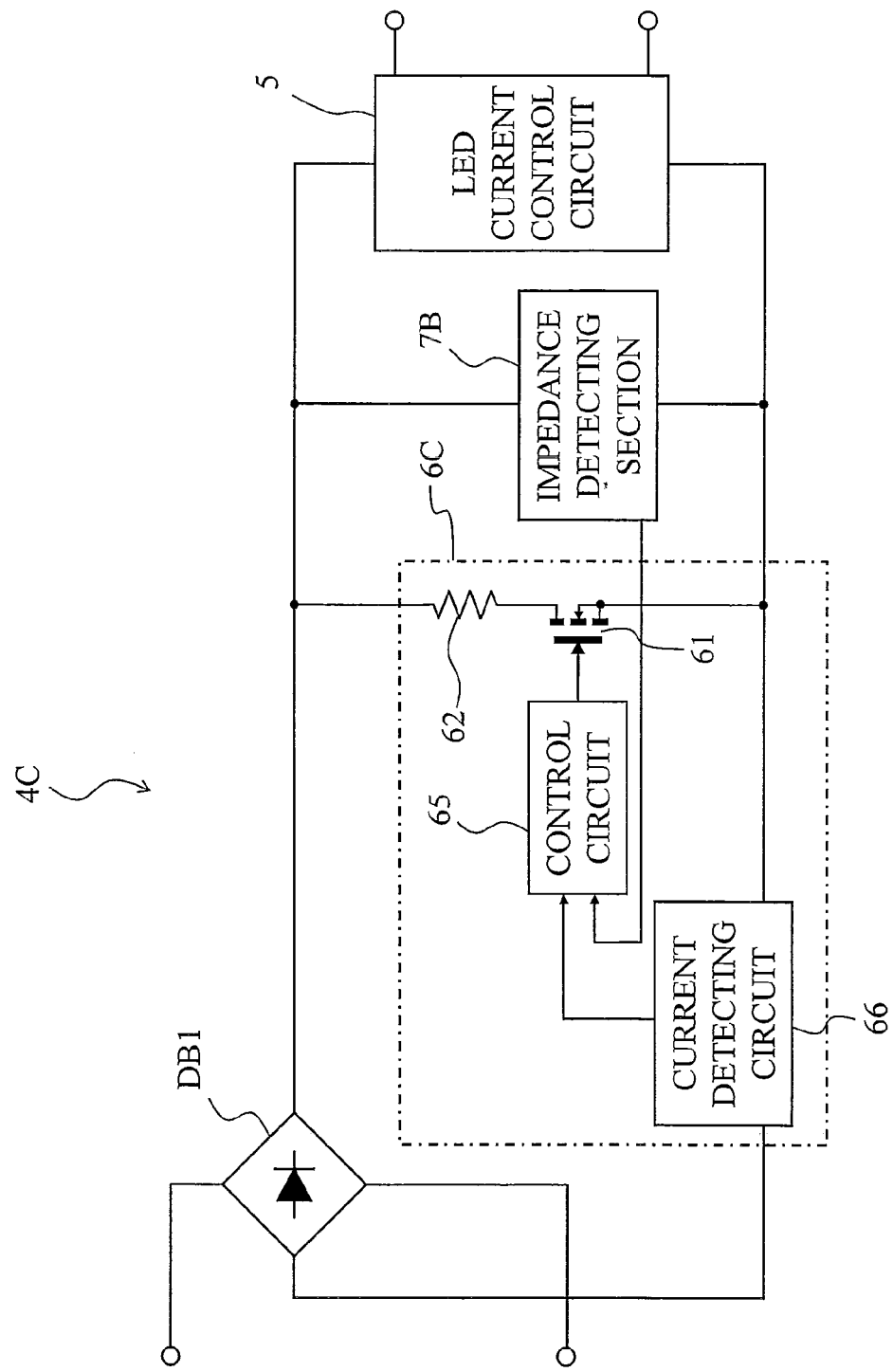

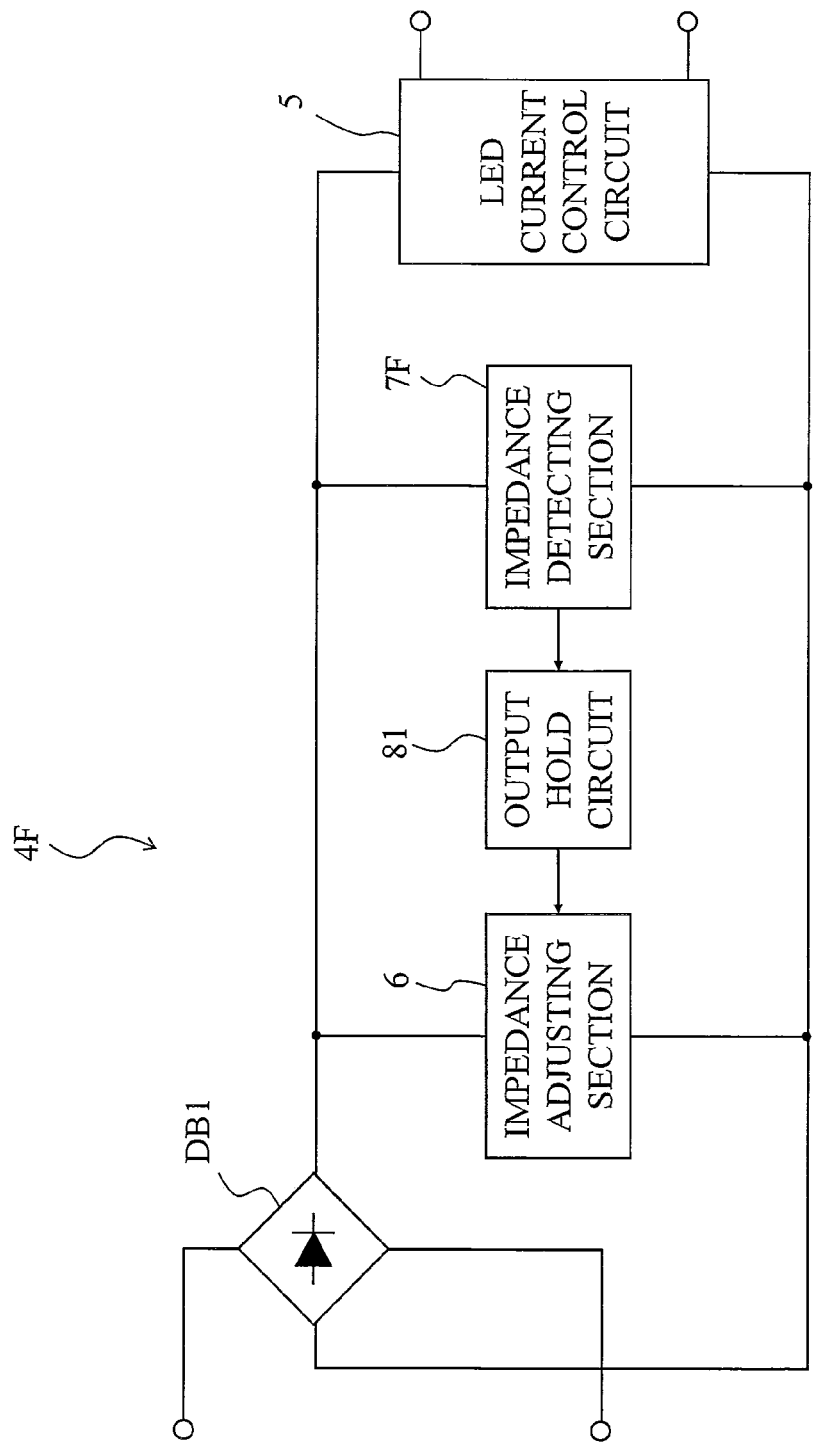

Fig.12
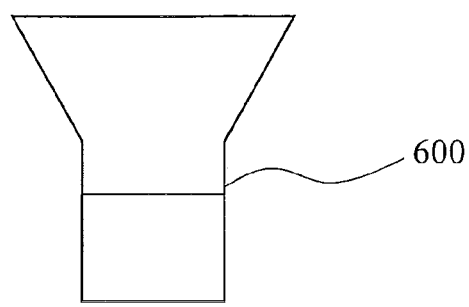
600
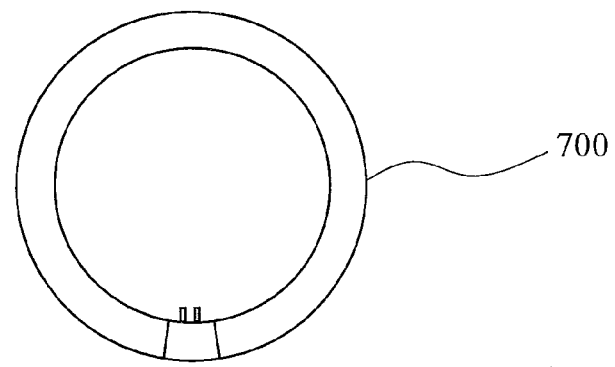
700
800

LED DRIVING CIRCUIT, LED ILLUMINATION APPLIANCE, LED ILLUMINATOR, AND LED ILLUMINATION SYSTEM

This application is based on Japanese Patent Application No. 2011-41421 filed on Feb. 28, 2011, the contents of which are hereby incorporated by reference.

BACKGROUND OF THE INVENTION

1. Field of the Invention

The present invention relates to an LED driving circuit for driving an LED, and an LED illumination appliance, an LED illuminator, and an LED illumination system, each using an LED as a light source.

2. Description of Related Art

An LED has features of low power consumption and long lifetime and has a spreading use not only for display devices but also for illumination equipment. For LED illumination appliances, a plurality of LEDs is used in many cases so as to obtain a desired illuminance.

General illumination equipment uses a commercial AC power source (AC 100 V in Japan) in many cases. In view of the case where an illumination appliance using the LED (hereinafter, referred to as "LED illumination appliance") is used in place of a general illumination appliance such as an incandescent bulb, the LED illumination appliance is desired to have a configuration using an AC power source as in the case of the general illumination appliance.

Moreover, in an illumination system for performing dimming control on the incandescent bulb, a phase-control type dimmer (generally referred to as "incandescent light controller") is used. The phase-control type dimmer enables easy dimming control by controlling power supply to the incandescent bulb with a single volume control element when a switching element is turned ON (in general, a thyristor or a triac element) at a certain phase angle of an AC power supply voltage.

For dimming control of the LED illumination appliance using the AC power source, it is desirable to use the phase-control type dimmer as in the case of the dimming control of the incandescent bulb. Here, a conventional example of the LED illumination system capable of performing the dimming control on the LED illumination appliance using the AC power source is illustrated in FIG. 13.

An LED illumination system illustrated in FIG. 13 includes a phase-control type dimmer 2, an LED driving circuit 94, and an LED module 3. The LED driving circuit 94 includes a diode bridge DB1, an impedance adjusting section 96, and an LED current control circuit 5. The phase-control type dimmer 2 is connected in series between an AC power source 1 and the LED driving circuit 94. The phase-control type dimmer 2 receives an AC voltage from the AC power source 1 to determine a phase at which a triac Tri1 corresponding to a current holding element is to be turned ON, by resistors RV1 and RV2, capacitors CV1 and CV2, and a diac Di1. Besides the triac, a MOS switch or the like is used as the current holding element in some cases.

The phase-control type dimmer 2 includes a noise-eliminating circuit including a capacitor CLC and an inductor LLC. In the phase-control type dimmer 2, the capacitor CLC determines an impedance when the triac Tri1 is not in an OFF state. The inductor LLC prevents a short-circuit current from flowing through the capacitor CLC when the triac Tri1 is turned ON.

For the dimming of the incandescent bulb by the phase-control type dimmer, it is known that the dimming cannot be normally performed when an incandescent bulb having a small wattage is connected to the dimmer because flickering or flashing occurs. The LED has a remarkably small wattage as compared with the incandescent bulb. Therefore, the flickering or flashing becomes a problem also in the case of the dimming of the LED with the phase-control type dimmer. Thus, in order to prevent the flickering or flashing in the LED illumination system described above, the impedance adjusting section 96 is used. Examples of the impedance adjusting section 96 include an OFF-time impedance adjusting section 961, an impedance adjusting section 962 for preventing malfunction due to resonance, and an impedance adjusting section 963 for maintaining a triac current. Hereinafter, each of the impedance adjusting sections is described referring to the drawings.

In the LED illumination system, when the phase-control type dimmer 2 is in an OFF state, that is, the triac Tri1 is in the OFF state, normally, power supply from the AC power source 1 to the LED driving circuit 94 should be cut off. However, the AC power source 1 and the LED driving circuit 94 are constantly electrically connected to each other by the capacitor CLC included in the noise-eliminating circuit of the phase-control type dimmer 2. Therefore, a finite impedance is generated by the capacitor CLC in the LED driving circuit 94 even when the triac Tri1 is in the OFF state. When the impedance is low, the phase-control type dimmer 2 does not operate normally in some cases. Therefore, the OFF-time impedance adjusting section 961 performs adjustment so that the impedance of the LED driving circuit 94 becomes sufficiently lower than that of the capacitor CLC. In this manner, a voltage is applied to both terminals of the phase-control type dimmer 2 when the phase-control type dimmer 2 is in the OFF state, and hence the phase-control type dimmer 2 operates normally. Note that, the OFF-time impedance adjusting section 961 is in an OFF state when the phase-control type dimmer 2 is in an ON state.

A circuit diagram illustrating an example of the OFF-time impedance adjusting circuit 961 is illustrated in FIG. 14A. As illustrated in FIG. 14A, the OFF-time impedance adjusting circuit 961 uses a comparator EA to compare a driver voltage applied to the LED driving circuit 94 and a voltage of a voltage source VA. The OFF-time impedance adjusting circuit 961 turns ON a switching element MA (MOS) when the driver voltage is lower than the voltage of the voltage source VA.

When the phase-control type dimmer 2 is in the OFF state, the driver voltage of the LED driving circuit becomes lower than the voltage of the voltage source VA. Therefore, a HIGH signal is input from the comparator EA to the switching element MA (in other words, a signal for impedance adjustment is input). As a result, the switching element MA is turned ON, and the impedance of the OFF-time impedance adjusting section 961 becomes an impedance determined by a resistance value of a resistor RA3. On the other hand, when the phase-control type dimmer 2 is in the ON state, the driver voltage becomes higher than the voltage of the voltage source VA. Therefore, a LOW signal is input from the comparator EA to the switching element MA (in other words, the signal for impedance adjustment is not input). As a result, the switching element MA is turned OFF, and the impedance of the OFF-time impedance adjusting section 961 becomes high.

Next, the impedance adjusting section 962 for preventing malfunction due to resonance is described. When the phase-control type dimmer 2 is turned ON, a current flowing through the triac Tri1 oscillates due to a resonance phenomenon between the capacitor CLC and the inductor LLC of the noise-eliminating circuit, which sometimes results in turning-OFF of the triac Tri1. Therefore, the current is controlled to flow through the impedance adjusting section 962 for preventing malfunction due to resonance so as to release energy stored in the capacitor CLC while the phase-control type dimmer 2 is in the OFF state, thereby suppressing the resonance between the capacitor CLC and the inductor LLC. Note that, the impedance adjusting section 962 for preventing malfunction due to resonance is required to temporarily allow a large current (for example, 200 mA for 200 μs) to flow therethrough, and therefore can be configured to include the capacitor or a combination of the capacitor and the resistor.

A circuit diagram illustrating an example of the impedance adjusting section 962 for preventing malfunction due to resonance is illustrated in FIG. 14B. As illustrated in FIG. 14B, the impedance adjusting section 962 for preventing malfunction due to resonance uses a comparator EB to compare the driver voltage applied to the LED driving circuit 94 and a voltage of a voltage source VB. When the driver voltage is higher than the voltage of the voltage source VB, a HIGH signal is output from the comparator EB. When the HIGH signal is output from the comparator EB, a switching element MB is turned ON.

While the switching element MB is in an ON state, a current flows through a current source IB to lower the impedance of the impedance adjusting section 962 for preventing malfunction due to resonance. The switching element MB is turned OFF depending on a time constant determined by an electrostatic capacitance of a capacitor CB and a resistance value of a resistor RB4. When the switching element MB is turned OFF, the current does not flow through the current source IB. As a result, the impedance of the impedance adjusting section 962 for preventing malfunction due to resonance becomes high.

As the last impedance adjusting section, the impedance adjusting section 963 for maintaining a triac current is described. The power consumed by the LED module 3 is small. That is, an amount of a current flowing through the LED module 3 is small, and an amount of a current flowing through the phase-control type dimmer 2 is correspondingly small. In view of this fact, the current flowing through the triac Tri1 sometimes becomes lower than a holding current. In such a case, a malfunction in which the triac Tri1 is turned OFF sometimes occurs. Therefore, the impedance adjusting section 963 for maintaining a triac current lowers the impedance when the amount of the current flowing through the triac Tri1 is small so as to allow the current to flow therethrough. In this manner, the current flowing through the triac Tri1 is maintained to be equal to or higher than the holding current.

A circuit diagram illustrating an example of the impedance adjusting section 963 for maintaining a triac current is illustrated in FIG. 14C. As illustrated in FIG. 14C, the impedance adjusting section 963 for maintaining a triac current is configured to use the resistor RA of the OFF-time impedance adjusting section 961 as a current source IC, and a basic operation thereof is the same as that of the OFF-time impedance adjusting section 961. The impedance adjusting section 963 for maintaining a triac current compares the driver voltage and a voltage of a voltage source VC. Depending on the result of the comparison, a current flows through the current source IC to lower the impedance of the impedance adjusting section 963 for maintaining a triac current.

As described above, some of the impedance adjusting sections use the resistor and the switch (the switch may be any of a mechanically driven switch and a semiconductor switch such as a MOS), others use a semiconductor active element such as a MOS or a transistor, which performs constant-current control. Note that, the impedance adjusting section is sometimes referred to as a current drawing section because the current flows therethrough. Specifically, the flow of the current through the impedance adjusting section allows a stable operation of the phase-control type dimmer 2 (dimming of the LED illumination appliance to be normally performed). Note that, as the impedance adjusting section, one of the three types of the impedance adjusting sections described above is used. In some cases, two or more types of the impedance adjusting sections are connected in parallel.

In an illumination system, pluralities of illumination appliances (LED illumination appliances) are often connected to the single phase-control type dimmer 2. In the illumination system described above, the pluralities of illumination appliances are simultaneously used in some cases. In other cases, however, each of the illumination appliances is used alone. For stable lighting of the illumination appliance when the illumination appliance is used alone, each of the illumination appliances includes the impedance adjusting section. The impedance adjusting section is configured so as to be able to sufficiently operate alone.

In the illumination system described above, a current required for the stable operation of the phase-control type dimmer flows through the impedance adjusting section when the illumination appliance is used alone. When the pluralities of illumination appliances are simultaneously used in the illumination system configured as described above, the current required for the dimming flows through the impedance adjusting section included in each of the illumination appliances.

The current flowing through the impedance adjusting section is a current which is not used to light the illumination appliance (LED), that is, a loss current. In the illumination system described above, when the pluralities of illumination appliances are simultaneously used, the loss current flows through the impedance adjusting section of each of the illumination appliances. Therefore, loss power becomes correspondingly large.

SUMMARY OF THE INVENTION

The present invention has been made in view of the problem described above, and therefore has an object to provide an LED driving circuit for stabilizing dimming when pluralities of illumination appliances are simultaneously lighted and for reducing a power loss, and an LED illumination appliance, an LED illuminator, and an LED illumination system, each including the LED driving circuit.

According to an exemplary embodiment of the present invention, there is provided an LED driving circuit connectable to a phase-control type dimmer, for inputting an alternating voltage to drive an LED, the LED driving circuit including: impedance detecting means for detecting an impedance value of the phase-control type dimmer; and impedance adjusting means for adjusting an impedance of the LED driving circuit based on the impedance value detected by the impedance detecting means.

In a preferred embodiment of the present invention, the impedance detecting means may output an adjustment signal for adjusting the impedance to the impedance adjusting means.

In a preferred embodiment of the present invention, the impedance detecting means stops detecting the impedance after a predetermined period of time, and the LED driving circuit further includes holding means for holding the output of the adjustment signal even after the stop of the detection of the impedance by the impedance detecting means.

In a preferred embodiment of the present invention, the adjustment signal is a signal indicating the impedance value detected by the impedance detecting means, and the impedance adjusting means determines an adjusted impedance value based on the adjustment signal and a current value of a current flowing through the impedance adjusting means.

In a preferred embodiment of the present invention, the adjustment signal is a signal indicating the impedance value detected by the impedance detecting means, and the impedance adjusting means determines an adjusted impedance value based on the adjustment signal and a current value of a current flowing through a power supply line for supplying power to the LED.

In a preferred embodiment of the present invention, pluralities of illumination appliances are connectable to the phase-control type dimmer, and the impedance detecting means determines, based on the detected impedance value, whether or not another one of the pluralities of illumination appliances is connected to the phase-control type dimmer.

In a preferred embodiment of the present invention, the impedance detecting means has a configuration allowing a current to flow therethrough, and the impedance detecting means allows the current to flow therethrough when the phase-control type dimmer is in an OFF state, and detects the impedance value based on a variation in a current value of the current.

In a preferred embodiment of the present invention, the impedance detecting means varies an impedance adjustment amount of the impedance adjusting means for a predetermined period of time when the phase-control type dimmer is in an OFF state, and detects the impedance value based on a variation in a current value caused thereby.

In a preferred embodiment of the present invention, when the impedance detecting means determines that the pluralities of illumination appliances are connected to the phase-control type dimmer, the impedance detecting means determines, based on the detected impedance value, whether or not the impedance is adjusted in another one of the pluralities of illumination appliances connected to the phase-control type dimmer, and when the impedance detecting means determines that the impedance is not adjusted in the another one of the pluralities of illumination appliances, the impedance adjusting means adjusts the impedance.

In a preferred embodiment of the present invention, the impedance adjusting means adjusts the impedance of the LED driving circuit at least when the phase-control type dimmer is in an OFF state.

In a preferred embodiment of the present invention, the impedance adjusting means adjusts the impedance at least for a predetermined period of time after the phase-control type dimmer is turned ON.

In a preferred embodiment of the present invention, the impedance adjusting means adjusts the impedance at least when the phase-control type dimmer performs dimming to a low brightness.

According to another exemplary embodiment of the present invention, an LED illumination appliance includes: the LED driving circuit according to any one of the above-mentioned embodiments, and an LED connected to an output side of the LED driving circuit.

According to still another exemplary embodiment of the present invention, an LED illuminator includes pluralities of illumination appliances, in which at least one of the pluralities of illumination appliances is the above-mentioned LED illumination appliance.

According to a further exemplary embodiment of the present invention, an LED illumination system includes: the above-mentioned LED illuminator, and a phase-control type dimmer, in which input sides of the pluralities of illumination appliances are connected in parallel to an output side of the phase-control type dimmer.

BRIEF DESCRIPTION OF THE DRAWINGS

FIG. 1 is a diagram illustrating an example of an LED illumination system according to the present invention;

FIG. 2A is a diagram illustrating an example of the LED illumination system in which three LED illumination appliances according to the present invention are connected;

FIG. 2C is a diagram illustrating another example of the LED illumination system in which one LED illumination appliance according to the present invention is connected;

FIG. 3B is a circuit diagram of the LED driving circuit illustrated in FIG. 3A;

FIG. 5 is a diagram illustrating a further example of the LED driving circuit according to the present invention;

FIG. 9 is a diagram illustrating a further example of the LED driving circuit according to the present invention;

FIG. 12 is a diagram illustrating another example of the schematic structure of the LED illumination appliance according to the present invention;

DETAILED DESCRIPTION OF PREFERRED EMBODIMENTS

Figure 2B:
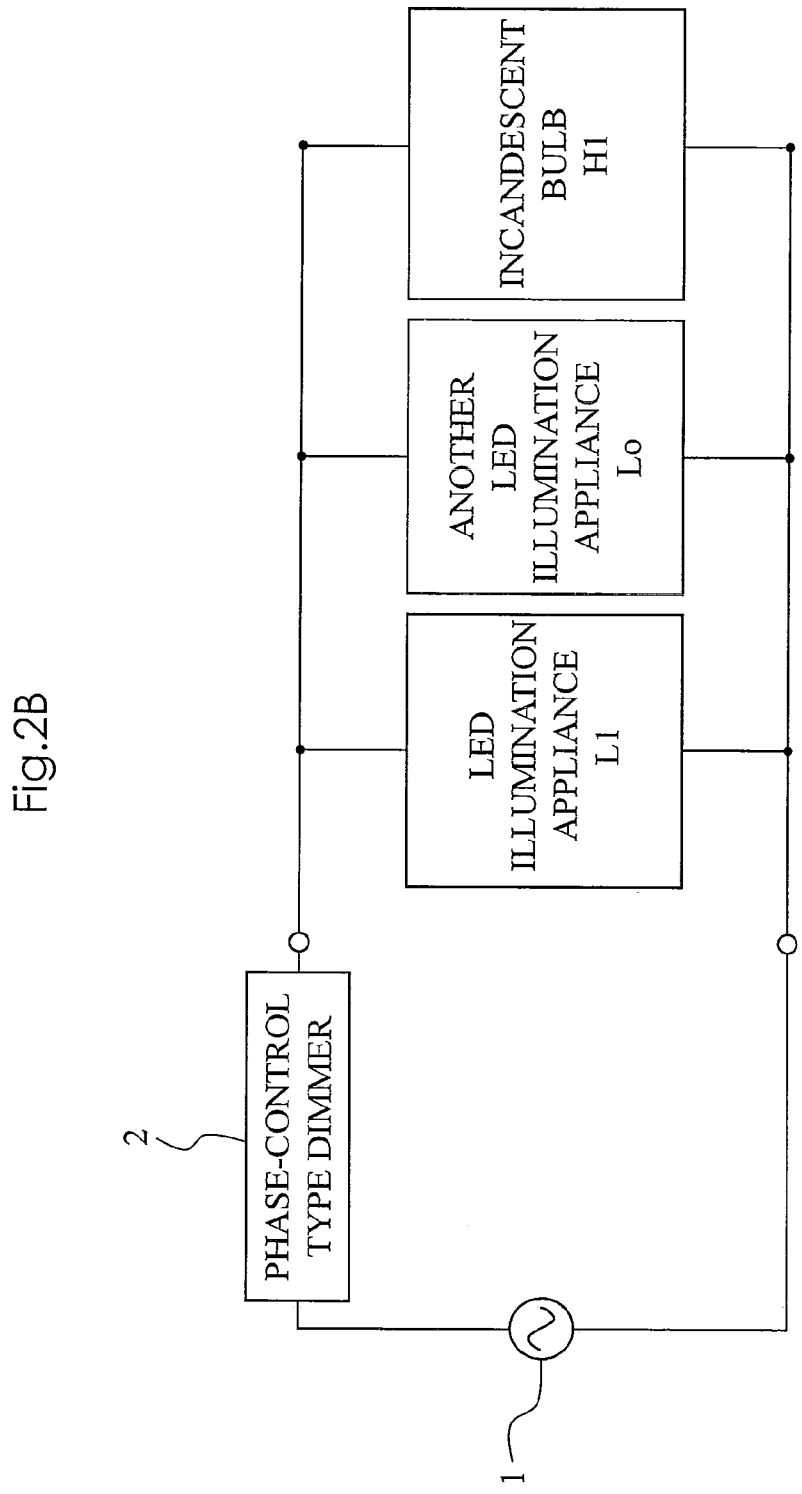
FIG. 2B is a diagram illustrating an example of the LED illumination system in which one LED illumination appliance according to the present invention is connected.

Hereinafter, embodiments of the present invention are described referring to the drawings.

(First Embodiment)

Figure 13:
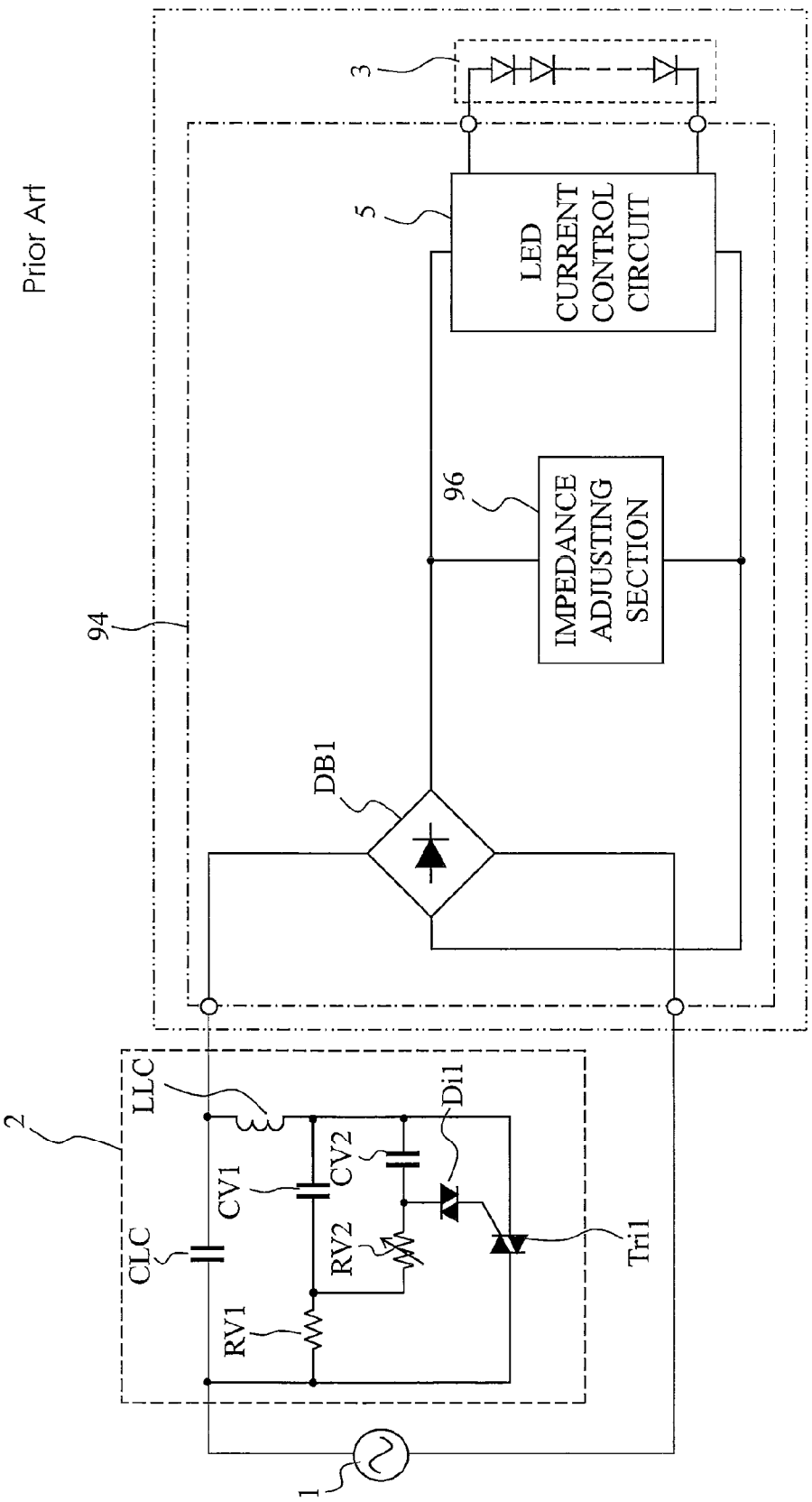
FIG. 13 is a diagram illustrating a conventional example of an LED illumination system capable of performing dimming control on an LED illumination appliance using an AC power source.
Figure 14A:
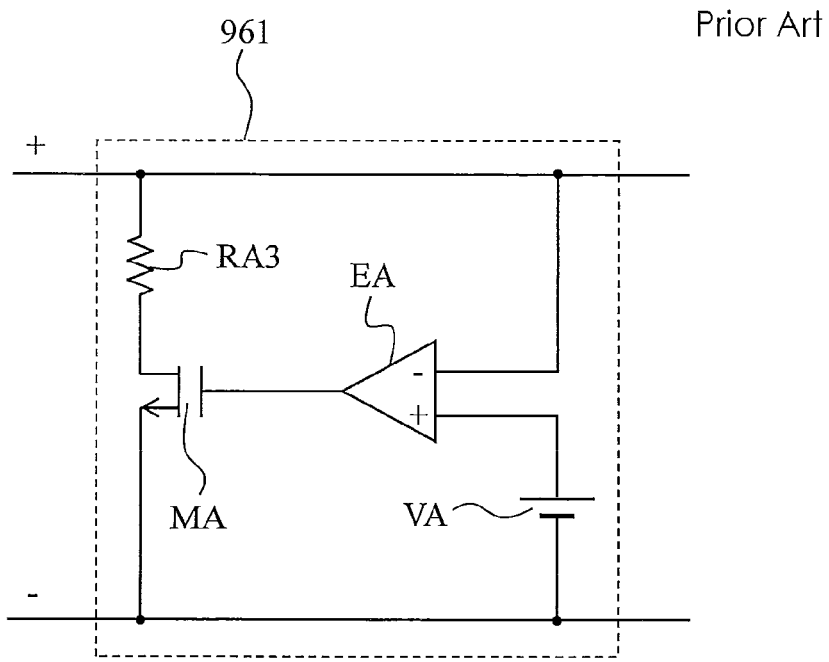
FIG. 14A is a circuit diagram illustrating a conventional impedance adjusting section.
Figure 14B:
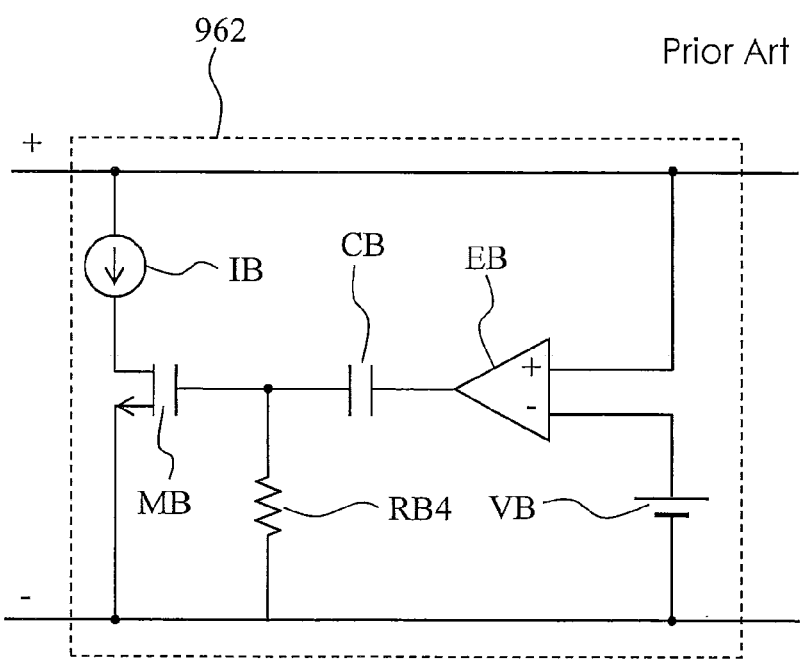
FIG. 14B is a circuit diagram illustrating another conventional impedance adjusting section.
Figure 14C:
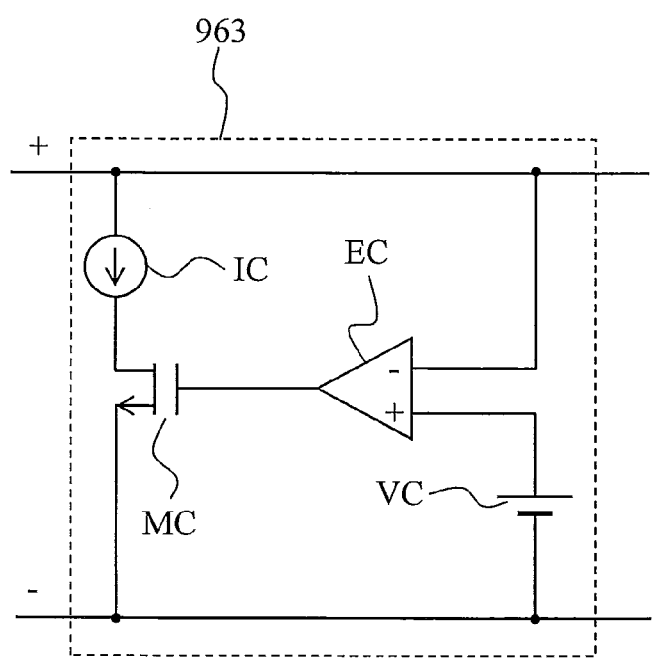
FIG. 14C is a circuit diagram illustrating a further conventional impedance adjusting section.

FIG. 1 is a diagram illustrating an example of an LED illumination system according to the present invention. In FIG. 1, the same parts as those illustrated in FIG. 13 are denoted by the same reference symbols, and the detailed description thereof is herein omitted. As illustrated in FIG. 1, the LED illumination system includes a phase-control type dimmer 2 and an LED illumination appliance L1 according to the present invention.

The LED illumination appliance L1 includes an LED driving circuit 4 and an LED module 3. The LED driving circuit 4 is an example of an LED driving circuit according to the present invention, and includes a diode bridge DB1, an LED current control circuit 5, an impedance adjusting section 6, and an impedance detecting section 7. As illustrated in FIG. 1, the LED current control circuit 5 is directly connected to an output side of the diode bridge DB in the LED driving circuit 4. An input side of the diode bridge DB1 is connected to an AC power source 1 and the phase-control type dimmer 2 (see FIG. 1 and the like).

The impedance adjusting section 6 is a circuit provided between both output terminals of the diode bridge DB1. The impedance adjusting section 6 adjusts an impedance between both the output terminals of the diode bridge DB1 in order to flow an LED driving current through the LED module 3 (LED current control circuit 5). Through adjusting of the impedance in the impedance adjusting section 6, the current flowing between both the output terminals of the diode bridge DB1 is adjusted to improve stability of dimming performed by the phase-control type dimmer 2 connected to the LED driving circuit 4.

The impedance detecting section 7 is provided between both the output terminals of the diode bridge DB1 as in the case of the impedance adjusting section 6. The impedance detecting section 7 detects the impedance of the phase-control type dimmer 2.

When it is determined based on the impedance value detected by the impedance detecting section 7 that the impedance is required to be adjusted (reduced) (for example, when the detected impedance value is larger than a given reference value), the impedance detecting section 7 transmits a signal (adjustment signal) for adjusting the impedance (for reducing the impedance) (in other words, transmits a HIGH signal; the same shall apply hereinafter) to the impedance adjusting section 6 based on the detected impedance value. By receiving the adjustment signal, the impedance adjusting section 6 adjusts (reduces) the impedance. On the other hand, when it is determined based on the impedance value detected by the impedance detecting section 7 that the impedance is not required to be adjusted, the impedance detecting section 7 does not transmit the adjustment signal (sometimes transmits a LOW signal; the same shall apply hereinafter) to the impedance adjusting section 6. As a result, the impedance adjusting section 6 does not adjust the impedance.

An adjusted impedance value by the impedance adjusting section 6 is set so that a current flows through the impedance adjusting section 6 to allow a triac Tri1 of the phase-control type dimmer 2 to maintain a holding current.

Alternatively, the impedance adjusting section 6 may determine the adjusted impedance value based on a received adjustment signal. Specifically, the impedance value to be obtained by the adjustment performed in the impedance adjusting section 6 may be determined based on the impedance value detected by the impedance detecting section 7. As a result, the adjustment can be performed in the impedance adjusting section 6 so as to prevent the impedance value from being excessively high or insufficiently low. Therefore, dimming can be stabilized, while an unnecessary power loss can be reduced.

Moreover, the impedance adjusting section 6 may be configured to adjust (reduce) the impedance when the phase-control type dimmer 2 is in an OFF state. In this case, the impedance detecting section 7 detects the impedance value and transmits the adjustment signal for impedance adjustment to the impedance adjusting section 6 based on the detected impedance value. In response to the adjustment signal, the impedance adjusting section 6 adjusts the impedance. In this manner, the impedance adjusting section 6 can adjust the impedance of the LED driving circuit 4 so that the impedance of the LED driving circuit 4 is sufficiently smaller than the impedance of the capacitor CLC so as to prevent a delay in an onset voltage of the triac Tri1. Moreover, the impedance adjusting section 6 adjusts the impedance based on the impedance value detected by the impedance detecting section 7, and therefore adjusts the impedance so as to prevent the impedance value from becoming excessively high or insufficiently low. In this manner, the dimming can be stabilized, while an unnecessary power loss can be reduced.

Further, the impedance adjusting section 6 may be configured to adjust (reduce) the impedance over a predetermined period of time when the phase-control type dimmer 2 is in an ON state. In this case, the impedance detecting section 7 detects the impedance value of the phase-control type dimmer 2 and transmits the adjustment signal for impedance adjustment to the impedance adjusting section 6 based on the detected impedance value. In response to the adjustment signal, the impedance adjusting section 6 adjusts the impedance, and a current flows through the impedance adjusting section 6. In this manner, the current flowing through the triac Tri1 can be prevented from becoming lower than the holding current due to resonance between the capacitor CLC and the inductor LLC of the phase-control type dimmer 2. Moreover, the impedance adjusting section 6 adjusts the impedance based on the impedance value detected by the impedance detecting section 7, and therefore adjusts the impedance so as to prevent the impedance value from becoming excessively high or insufficiently low. In this manner, the dimming can be stabilized, while an unnecessary power loss can be reduced.

Moreover, the impedance adjusting section 6 may be configured to adjust (reduce) the impedance when the phase-control type dimmer 2 performs dimming to a low brightness. Note that, the dimming is likely to be unstable during the dimming to the low brightness, but the impedance adjusting section 6 may be continuously driven so as to stabilize the dimming even when the brightness becomes high.

(Second Embodiment)

An LED illumination system according to the present invention has a configuration in which pluralities of illumination appliances can be connected to one phase-control type dimmer. FIG. 2A illustrates the LED illumination system in which pluralities of LED illumination appliances are connected to a phase-control type dimmer. Note that, the configuration of the phase-control type dimmer 2 illustrated in FIG. 2A is the same as that illustrated in FIG. 1, and therefore the detailed description thereof is herein omitted. As illustrated in FIG. 2A, the LED illumination system includes LED illumination appliances L1, L2, and L3 according to the present invention which are connected in parallel to the single phase-control type dimmer 2. In the LED illumination system, the LED illumination appliances L1, L2, and L3 are selectively lightable by a mechanical switch, a semiconductor switching element such as a MOS, or the like.

In the LED illumination system illustrated in FIG. 2A, assume a case where the LED illumination appliance L1 alone is to be lighted. When the phase-control type dimmer 2 is turned ON, the LED driving current is supplied only to the LED illumination appliance L1 in the LED illumination system.

The impedance detecting section 7 of the LED illumination appliance L1 detects the impedance value of the phase-control type dimmer 2. At this time, the other LED illumination appliances L2 and L3 are not lighted. Therefore, the impedances are not adjusted (reduced) in the LED illumination appliances L2 and L3. In this state, the impedance detecting section 7 of the LED illumination appliance L1 determines, based on the detected impedance value, that the impedance is not adjusted (reduced) in the LED illumination appliances L2 and L3.

When determining that the impedance is not adjusted (reduced) in the other LED illumination appliances L2 and L3, the impedance detecting section 7 transmits the adjustment signal to the impedance adjusting section 6 of the LED illumination appliance L1. When receiving the adjustment signal, the impedance adjusting section 6 adjusts (reduces) the impedance based on the received adjustment signal to allow the current to flow through the impedance adjusting section 6 (draws the current) so as to improve the stability of dimming.

The adjusted value of the impedance by the impedance adjusting section 6 is set to a value which enables the triac Tri1 of the phase-control type dimmer 2 to maintain the holding current by allowing the current to flow through the impedance adjusting section 6.

Moreover, in the LED illumination system, the LED illumination appliance L1 is lighted in some cases while at least one of the LED illumination appliances L2 and L3 is lighted. For example, suppose that the LED illumination appliance L1 is lighted while the LED illumination appliance L2 is lighted. Then, the LED illumination appliance L2 is already lighted, and hence the impedance is adjusted (reduced) in the LED illumination appliance L2.

At this time, the impedance detecting section 7 of the LED illumination appliance L1 detects the impedance of the phase-control type dimmer 2. The impedance is already adjusted (reduced) in the LED illumination appliance L2. Therefore, based on the detected impedance value, the impedance detecting section 7 of the LED illumination appliance L1 determines that the impedance is adjusted (reduced) in the illumination appliance (LED illumination appliance L2 in this case) other than the LED illumination appliance L1. Hence, the impedance detecting section 7 does not transmit the adjustment signal to the impedance adjusting section 6. As a result, the impedance adjusting section 6 does not adjust (reduce) the impedance. Thus, the current drawing for stabilizing the dimming is not performed in the LED illumination appliance L1.

As described above, when the pluralities of LED illumination appliances L1, L2, and L3 are connected to the single phase-control type dimmer 2, the impedance adjustment (reduction) is prevented from being performed in each of the pluralities of LED illumination appliances L1, L2, and L3. As a result, an unnecessary power loss can be reduced.

Note that, in the example described above, the LED illumination system in which the three LED illumination appliances according to the present invention are connected to the single phase-control type dimmer 2 has been described. However, the LED illumination system according to the present invention is not limited thereto. Two, four or more LED illumination appliances according to the present invention may be connected in the LED illumination system.

Moreover, for example, in some cases, the LED illumination appliances L2 and L3 are turned OFF from a state in which the LED illumination appliances L1, L2, and L3 are all lighted. In addition, the impedance is not adjusted (reduced) in the LED illumination appliance L1. This case is described below.

The impedance detecting section 7 of the LED illumination appliance L1 detects the impedance. When the LED illumination appliances L2 and L3 are turned OFF, the impedance detecting section 7 determines, based on the detected impedance, that the impedance adjustment (reduction) which has been performed in one of the other LED illumination appliances L2 and L3 is not performed any more. Therefore, the impedance detecting section 7 transmits the adjustment signal to the impedance adjusting section 6. The operation of the impedance adjusting section 6 is the same as that described above, and therefore the description thereof is herein omitted. As described above, with the provision of the impedance detecting section 7, the impedance of the phase-control type dimmer 2 can be reliably adjusted (reduced) to prevent the dimming from becoming unstable. Moreover, the impedance adjustment (reduction) is performed as needed. Therefore, an unnecessary loss power can be reduced.

FIGS. 2B and 2C are diagrams illustrating other examples of the LED illumination system illustrated in FIG. 2A. As illustrated in FIG. 2B, in the LED illumination system, one of three illumination appliances is the LED illumination appliance L1 according to the present invention. One of the two other illumination appliances is an LED illumination appliance Lo having a different configuration from that of the LED illumination appliance of the present invention, and the other one is an incandescent bulb H1.

In the LED illumination system having the configuration described above, when the LED illumination appliance L1 is lighted while at least one of the different LED illumination appliance Lo and the incandescent bulb H1 is lighted, the impedance detecting section 7 detects the impedance value of the phase-control type dimmer 2. Based on the detected impedance value, the impedance detecting section 7 determines that the impedance is adjusted (reduced) in the different LED illumination appliance Lo and (or) the incandescent bulb H1. As a result, the adjustment signal is not transmitted to the impedance adjusting section 6. Thus, the impedance adjusting section 6 does not adjust (reduce) the impedance. As a result, the dimming can be stabilized, while an unnecessary power loss can be reduced.

Further, as illustrated in FIG. 2C, there is also a case where the LED illumination appliance L1 according to the present invention and two incandescent bulbs H1 and H2 are connected in the LED illumination system. Similarly to the case illustrated in FIG. 2B, also in this case, the impedance detecting section 7 of the LED illumination appliance L1 determines, based on the detected impedance value, whether or not the impedance is adjusted (reduced) in the incandescent bulb H1 and (or) the incandescent bulb H2. When determining that the impedance is not adjusted (reduced), the impedance detecting section 7 transmits the adjustment signal to the impedance adjusting section 6. Then, the impedance adjusting section 6 adjusts (reduces) the impedance and draws the current. When determining that the impedance is adjusted (reduced), the impedance detection section 7 does not transmit the adjustment signal to the impedance adjusting section 6. That is, unnecessary impedance adjustment (reduction) is not performed.

As described above, in the LED illumination system according to the present invention, the dimming can be stabilized, while an unnecessary power loss can be reduced. Note that, the following embodiments describe the LED driving circuits according to the present invention, but it should be understood that each of the LED driving circuits can be used for the LED illumination systems and the LED illumination appliances described above.

(Third Embodiment)

Figure 3A:
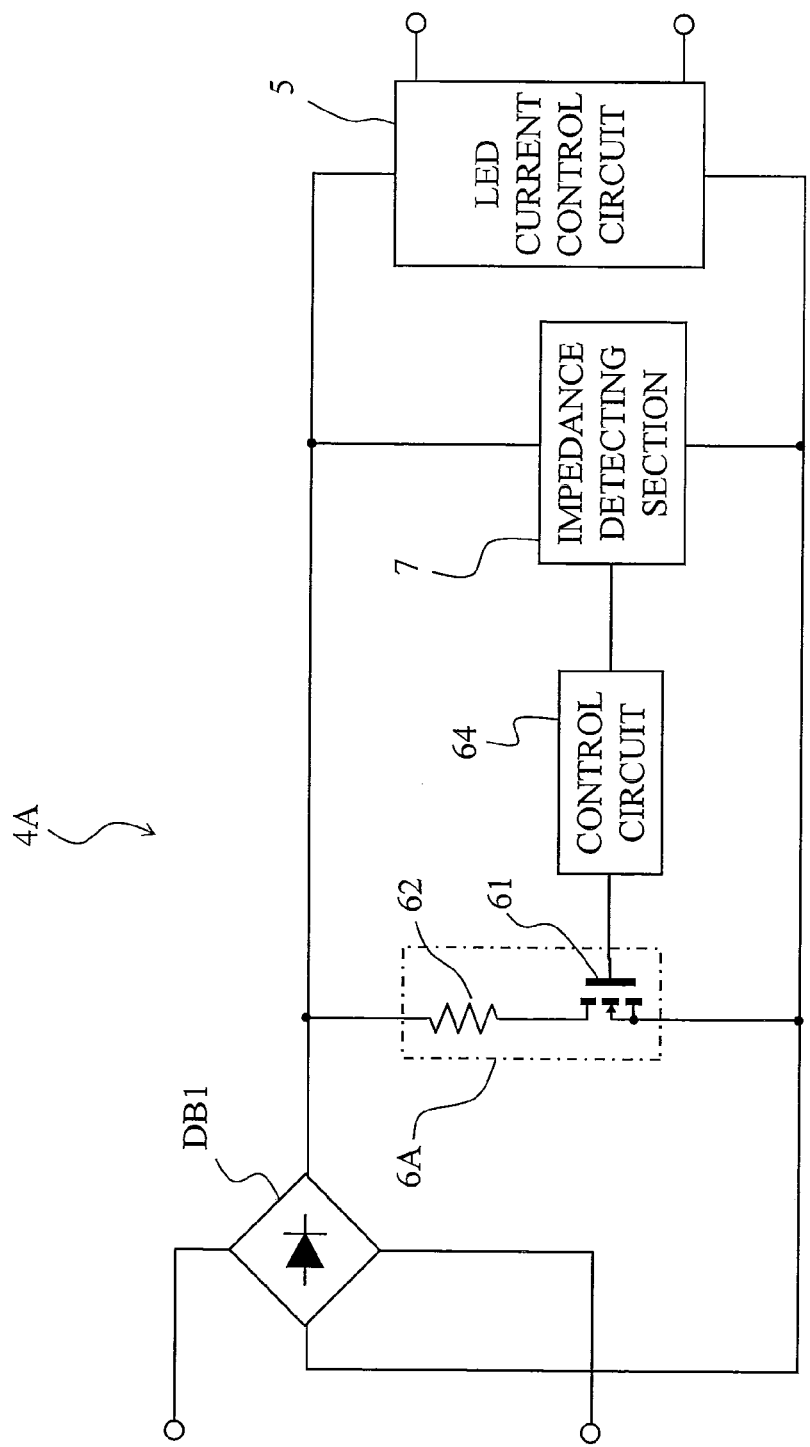
FIG. 3A is a diagram illustrating an example of an LED driving circuit according to the present invention.

Next, an example of the LED driving circuit according to the present invention is described referring to the drawings. FIG. 3A is a diagram illustrating the example of the LED driving circuit according to the present invention. Note that, the same parts as those illustrated in FIG. 13 are denoted by the same reference symbols in FIG. 3A, and the detailed description thereof is herein omitted. An LED driving circuit 4A illustrated in FIG. 3A includes an impedance adjusting section 6A. The impedance adjusting section 6A includes an n-type MOSFET 61 and a resistor 62. The resistor 62 is connected to a drain electrode of the n-type MOSFET 61. A control circuit 64 is connected to a gate electrode of the n-type MOSFET 61. The LED driving circuit 4A determines, outside the impedance detecting section 7, whether or not the impedance is required to be adjusted.

The n-type MOSFET 61 is normally in the OFF state, and therefore a current does not flow between the drain and a source. On the other hand, by receiving the adjustment signal (voltage signal) from the control circuit 64 at the gate electrode, the n-type MOSFET 61 is turned ON to allow the current to flow between the drain and the source. That is, the impedance of the impedance adjusting section 6A is reduced.

The impedance detecting section 7 detects the impedance of the phase-control type dimmer 2 and transmits a signal informing the detected impedance value to the control circuit 64. The control circuit 64 determines whether or not the impedance is adjusted (reduced) in the LED illumination system (in another illumination appliance; see FIGS. 2A to 2C and the like). When determining that the impedance is not adjusted (reduced) in the LED illumination system, the control circuit 64 transmits the adjustment signal to the gate electrode of the n-type MOSFET 61. As a result, the n-type MOSFET 61 is turned ON to allow the current to flow between the drain and the source, whereby the impedance value of the impedance adjusting section 6A is reduced.

On the other hand, when determining, based on the impedance value detected by the impedance detecting section 7, that the impedance is adjusted (reduced) in the LED illumination system, the control circuit 64 does not transmit the adjustment signal. As a result, the n-type MOSFET 61 maintains the OFF state, and hence the impedance adjustment (reduction) is not performed in the impedance adjusting section 6A.

As described above, an unnecessary current can be prevented from flowing through the impedance adjusting section 6A in the LED driving circuit 4A. Moreover, the control circuit 64 determines whether or not the impedance adjustment (reduction) is required in the LED illumination system. As a result, the use of the LED driving circuit 4A can stabilize the dimming and reduce an unnecessary loss power.

A circuit diagram of the example of the LED driving circuit according to this embodiment is illustrated in FIG. 3B. As illustrated in FIG. 3B, a signal from a voltage source VA is input to a non-inversion side terminal of a comparator EA of the control circuit 64, whereas the signal (indicating the impedance value) from the impedance detecting section 7 is input to an inversion side terminal of the comparator EA. A LOW signal is forcibly output (the adjustment signal is not output) from the comparator EA in response to the signal from the impedance detecting section 7.

Note that, in this embodiment, the control circuit 64 is formed outside the impedance adjusting section 6A. However, the control circuit 64 may be included in the impedance adjusting section 6A (for example, an IC package or the like).

(Fourth Embodiment)

Figure 4A:
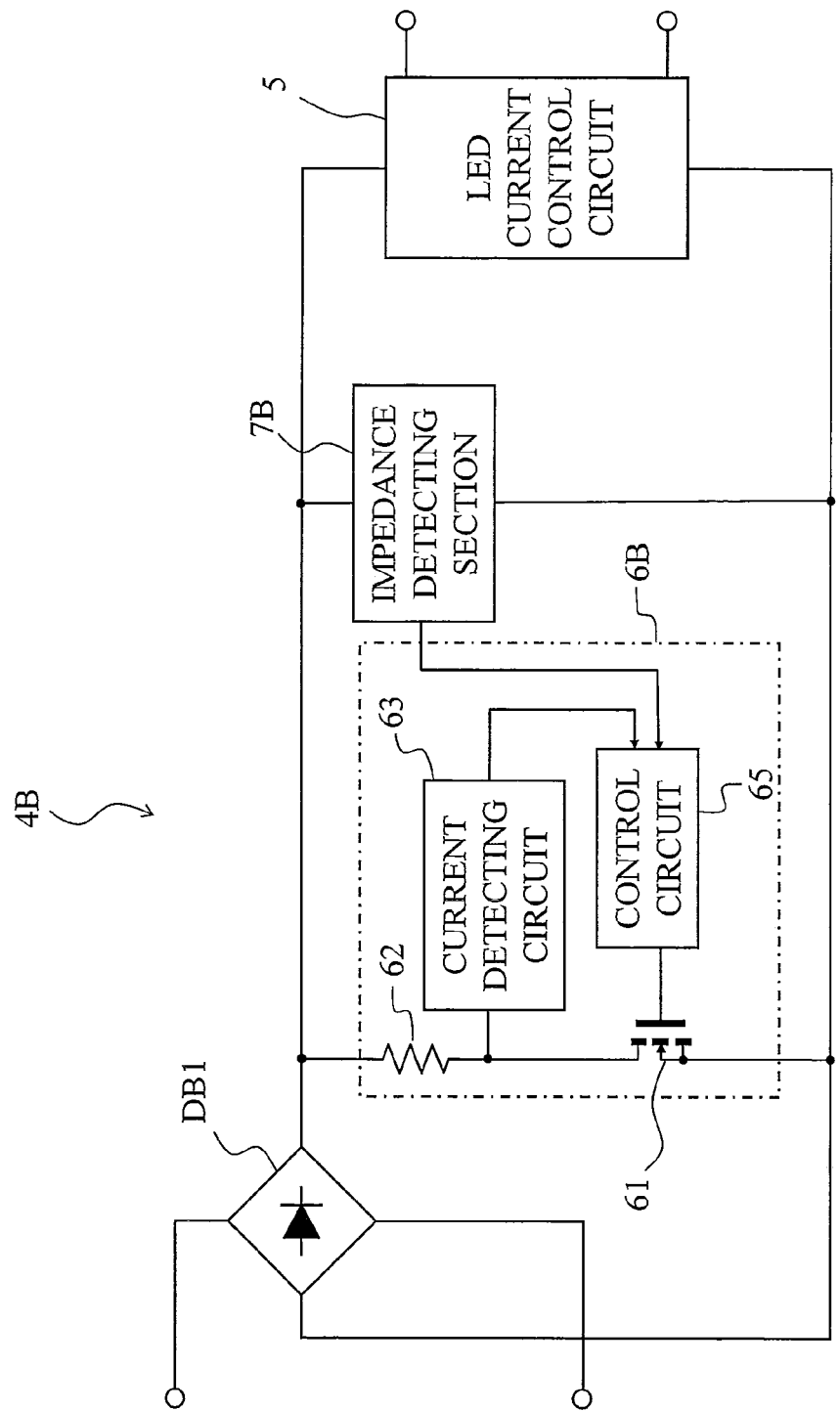
FIG. 4A is a diagram illustrating another example of the LED driving circuit according to the present invention.

Next, another example of the LED driving circuit according to the present invention is described referring to the drawings. FIG. 4A is a diagram illustrating another example of the LED driving circuit according to the present invention. Note that, the same parts as those illustrated in FIG. 3 are denoted by the same reference symbols in FIG. 4A, and the detailed description thereof is herein omitted. An LED driving circuit 4B illustrated in FIG. 4A includes an impedance adjusting section 6B and an impedance detecting section 7B.

Similarly to the impedance adjusting section 6A, the impedance adjusting section 6B includes a combination of the n-type MOSFET 61 and the resistor 62. The impedance adjusting section 6B further includes a current detecting circuit 63 and a control circuit 65. The current detecting circuit 63 detects a current value of a current flowing through the impedance adjusting section 6B. The control circuit 65 operates the n-type MOSFET 61.

The impedance detecting section 7B transmits the adjustment signal containing information on the detected impedance value to the control circuit 65. The control circuit 65 is connected to the gate electrode of the n-type MOSFET 61 of the impedance adjusting section 6B. A signal of the current value of the impedance adjusting section 6B, which is detected by the current detecting circuit 63, and the adjustment signal containing the information on the impedance value detected by the impedance detecting section 7B are input to the control circuit 65.

When receiving the adjustment signal from the impedance detecting section 7B, the control circuit 65 determines, based on the impedance value, whether or not the impedance adjustment (reduction) is required. When determining that the impedance adjustment (reduction) is required, the control circuit 65 transmits a driving signal (here, equivalent to the adjustment signal) to the gate electrode of the n-type MOSFET 61 to turn ON the n-type MOSFET 61. At this time, the current flows through the impedance adjusting section 6B. The current value of the current flowing through the impedance adjusting section 6B is detected by the current detecting circuit 63 and is transmitted to the control circuit 65 as the signal of the current value.

The control circuit 65 detects the current value of the current flowing through the impedance adjusting section 6B based on the signal received from the current detecting circuit 63 and compares the detected current value with a current value required to stabilize the dimming. When determining that the current value of the current flowing through the impedance adjusting section 6B is substantially the same as the current value required to stabilize the dimming, the control circuit 65 continues transmitting the current driving signal to the gate electrode of the n-type MOSFET 61. On the other hand, when the current value of the current flowing through the impedance adjusting section 6B is larger than the current value required to stabilize the dimming, the control circuit 65 varies the driving signal transmitted to the n-type MOSFET 61 (lowers a gate voltage) to limit the current flowing through the n-type MOSFET 61. As a result, the impedance of the impedance adjusting section 6B increases.

Note that, in the LED driving circuit 4B, generally, the impedance of the impedance adjusting section 6B is remarkably reduced in many cases so as to reliably stabilize the dimming. Due to characteristics of the LED driving circuit 4B, the control circuit 65 transmits the adjustment signal to the impedance adjusting section 6B on an assumption that the current value of the current flowing through the impedance adjusting section 6B is equal to or larger than the current value required to stabilize the dimming. However, the driving signal may be transmitted also in view of the case where the current value of the current flowing through the impedance adjusting section 6B is smaller than the current value required to stabilize the dimming.

In the case where the impedance is adjusted (reduced) (for example, in another illumination appliance) in the LED illumination system, the control circuit 65 determines, based on the adjustment signal transmitted from the impedance detecting section 7B, that the impedance is not required to be adjusted (reduced). Therefore, the control circuit 65 does not transmit the driving signal to the n-type MOSFET 61. In this state, the n-type MOSFET 61 remains in the OFF state. The impedance of the impedance adjusting section 6B remains high, and therefore the current does not flow therethrough.

As described above, according to the LED driving circuit 4B, even in the case where the impedance is required to be adjusted (reduced), the current for stabilizing the dimming can be prevented from flowing more than necessary. The use of the LED driving circuit 4B can stabilize the dimming and reduce an unnecessary loss power.

Figure 4B:
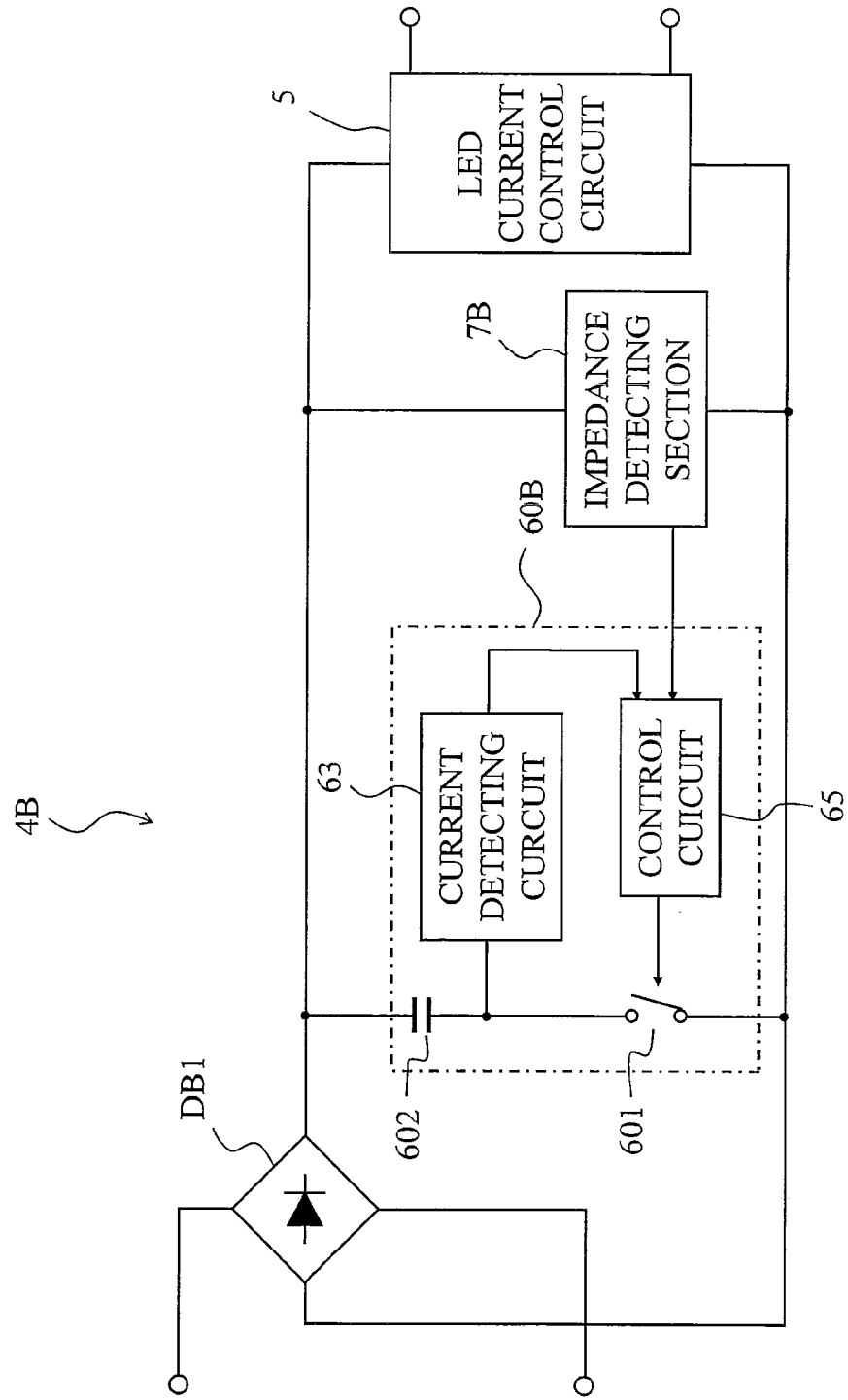
FIG. 4B is a diagram illustrating a modification of the LED driving circuit illustrated in FIG. 4A.

As illustrated in FIG. 4B, an impedance adjusting section 60B may include a MOS switch 601 and a capacitor 602. In this configuration, the MOS switch 601 is operated by the control circuit 65 to bring the capacitor 602 into an open state. In this manner, the impedance of the impedance adjusting section 60B can be increased to reduce a current value of a current flowing through the impedance adjusting section 60B.

Note that, in the LED driving circuit 4B, the current detecting circuit 63 and the control circuit 65 form a part of the impedance adjusting section, but the configuration of the LED driving circuit 4B is not limited thereto. The current detecting circuit 63 and the control circuit 65 may be provided separately from the impedance adjusting section.

(Fifth Embodiment)

FIG. 5 is a diagram illustrating a further example of the LED driving circuit according to the present invention. Note that, the same parts as those illustrated in FIG. 3 are denoted by the same reference symbols in FIG. 5, and the detailed description thereof is herein omitted. An LED driving circuit 4C illustrated in FIG. 5 includes an impedance adjusting section 6C and the impedance detecting section 7B.

Similarly to the impedance adjusting section 6A, the impedance adjusting section 6C includes a combination of the n-type MOSFET 61 and the resistor 62. The impedance adjusting section 6C includes a current detecting circuit 66 and the control circuit 65. The current detecting circuit 66 detects a current value of a power supply line LN1 for supplying driving power to the LED current control circuit 5. The control circuit 65 operates the n-type MOSFET 61. The impedance detecting section 7B detects the impedance value of the phase-control type dimmer 2 and transmits the adjustment signal indicating the detected impedance value to the control circuit 65.

The control circuit 65 is connected to the gate electrode of the n-type MOSFET 61 of the impedance adjusting section 6C. A signal of the current value of the power supply line LN1, which is detected by the current detecting circuit 66, and the adjustment signal containing the information on the impedance value detected by the impedance detecting section 7B are input to the control circuit 65.

The control circuit 65 determines, based on the adjustment signal from the impedance detecting section 7B and a signal of a current value of the LED driving current from the current detecting circuit 66, whether or not the impedance is required to be adjusted (reduced) in the impedance adjusting section 6C. When determining that the impedance adjustment (reduction) is required, the control circuit 65 transmits the driving signal to the gate electrode of the n-type MOSFET 61 to turn ON the n-type MOSFET 61. At this time, the current flows through the impedance adjusting section 6C.

For example, there is a case where the LED module 3 is to be dimmed to a low brightness in the LED driving circuit 4C. In this case, the current value of the LED driving current for driving the LED module 3 is small. Therefore, a current value of the current flowing through the power supply line LN1 becomes correspondingly small. That is, the current value of the current flowing through the LED driving circuit 4C becomes small. When the current value of the current flowing through the LED driving circuit 4C is small, it is difficult to maintain the current value of the current flowing through the triac Tri1 of the phase-control type dimmer 2 to a holding current value of the triac Tri1.

Therefore, the impedance adjusting section 6C detects the current value of the current flowing through the power supply line LN1 by the current detecting circuit 66 and transmits the detected current value to the control circuit 65. Then, the control circuit 65 determines whether or not the current value of the current flowing through the power supply line LN1 is a current value which allows the triac Tri1 to maintain the holding current. When determining that it is difficult for the triac Tri1 to maintain the holding current, the control circuit 65 transmits the driving signal (applies voltage) to the gate electrode of the n-type MOSFET 61 to allow the current to flow (increase amount of current) between the drain and the source of the n-type MOSFET 61.

As a result of the flow (increase in amount) of the current through the n-type MOSFET 61, the amount of current flowing through the power supply line LN1 can be increased to allow the current having the holding current value to flow through the triac Tri1. The control circuit 65 adjusts the adjustment signal (voltage) based on the current value transmitted from the current detecting circuit 66 to thereby adjust the current flowing through the n-type MOSFET 61 (adjust the impedance of the impedance adjusting section 6C).

Specifically, when the current value of the current flowing through the power supply line LN1 is substantially the same as the current value required to allow the holding current to flow through the triac Tri1, the control circuit 65 continues transmitting the current driving signal to the gate electrode of the n-type MOSFET 61 so as to maintain the current value of the current flowing through the n-type MOSFET 61. On the other hand, when the current value of the current flowing through the power supply line LN1 is larger than the current value required to allow the holding current to flow through the triac Tri1, the control circuit 65 varies the adjustment signal to be transmitted to the n-type MOSFET 61 (lowers gate voltage) to thereby limit the current flowing through the n-type MOSFET 61. In this manner, the impedance adjusting section 6C adjusts the impedance.

The control circuit 65 also receives the adjustment signal from the impedance detecting section 7B. When determining, based on the adjustment signal received from the impedance detecting section 7B, that the impedance is adjusted (reduced)

in another one of the illumination appliances connected to the phase-control type dimmer 2, the control circuit 65 maintains the n-type MOSFET 61 in the OFF state without transmitting the driving signal to the gate electrode of the n-type MOSFET 61.

Note that, when the impedance is to be adjusted (reduced) in the LED driving circuit 4C, generally, the impedance of the impedance adjusting section 6C is remarkably reduced in many cases so as to reliably stabilize the dimming. Due to characteristics of the LED driving circuit 4C, the control circuit 65 transmits the driving signal to the impedance adjusting section 6C on an assumption that the current value of the LED driving current is equal to or larger than the current value required to stabilize the dimming. However, the driving signal for reducing the impedance may be transmitted also in view of the case where the current value of the LED driving current is smaller than the current value required to stabilize the dimming.

As described above, according to the LED driving circuit 4C, even in the case where the impedance is required to be adjusted (reduced), the current value of the current for stabilizing the dimming can be reduced. In this manner, the use of the LED driving circuit 4C can stabilize the dimming and reduce an unnecessary loss power.

Note that, in the LED driving circuit 4C, the current detecting circuit 66 and the control circuit 65 form a part of the impedance adjusting section, but the configuration of the LED driving circuit 4C is not limited thereto. The current detecting circuit 66 and the control circuit 65 may be provided separately from the impedance adjusting section.

(Sixth Embodiment)

Figure 6A:
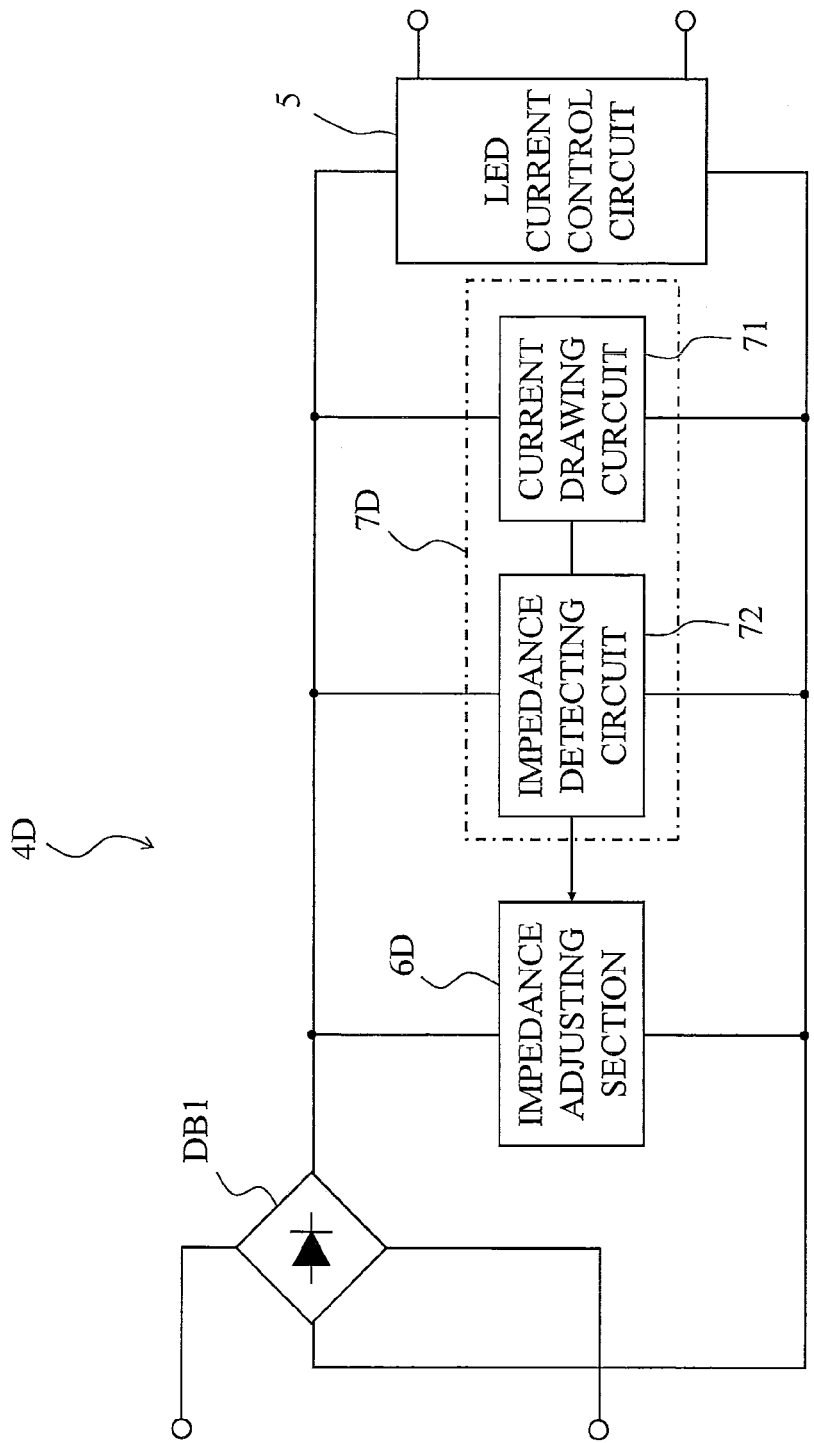
FIG. 6A is a diagram illustrating a further example of the LED driving circuit according to the present invention.

FIG. 6A is a diagram illustrating a further example of the LED driving circuit according to the present invention. Note that, the same parts as those illustrated in FIG. 1 are denoted by the same reference symbols in FIG. 6A, and the detailed description thereof is herein omitted. An LED driving circuit 4D illustrated in FIG. 6A includes an impedance adjusting section 6D and an impedance detecting section 7D.

As illustrated in FIG. 6A, the impedance detecting section 7D includes a current drawing circuit 71 and an impedance detecting circuit 72. The current drawing circuit 71 detects an oscillation of the current flowing through the triac Tri1 when the phase-control type dimmer 2 is turned ON. A current flows through the current drawing circuit 71 for a short period of time (for example, 200 µs). The current drawing circuit 71 can have the same configuration as, for example, that of a conventional OFF-time impedance adjusting section. The impedance detecting circuit 72 detects the impedance based on a current value of the current flowing through the current drawing circuit 71.

For example, in some cases, only an LED illumination appliance including the LED driving circuit 4D may be connected to the LED illumination system or only the LED illumination appliance including the LED driving circuit 4D among the pluralities of illumination appliances connected to the LED illumination system may be lighted.

In the above-mentioned cases, the current flowing through the triac Tri1 of the phase-control type dimmer 2 oscillates, and therefore greatly reduces the impedance of the LED illumination appliance including the LED driving circuit 4D. As a result, the current flows through the current drawing circuit 71. The impedance detecting circuit 72 compares the current flowing through the current drawing circuit 71 and a given reference current to thereby determine whether or not only the LED illumination appliance including the LED driving circuit 4D is lighted by turning ON the phase-control type dimmer 2. When determining that only the LED illumination appliance including the LED driving circuit 4D is turned ON, the impedance detecting circuit 72 transmits the adjustment signal to the impedance adjusting section 6D to reduce the impedance. In this manner, flickering or flashing due to a resonance occurring when the phase-control type dimmer 2 is turned ON can be suppressed.

When determining that an illumination appliance other than the LED illumination appliance including the LED driving circuit 4D has been previously turned ON, the impedance detecting circuit 72 determines that an operation of adjustment (reduction) of the impedance is performed in another one of the illumination appliances, and therefore does not transmit the adjustment signal to the impedance adjusting section 6D. Thus, the impedance adjusting section 6D does not adjust (reduce) the impedance.

As described above, the impedance adjusting section 6D adjusts the impedance based on the adjustment signal from the impedance detecting section 7D. Therefore, the dimming can be stabilized, while an unnecessary power loss can be reduced.

Figure 6B:
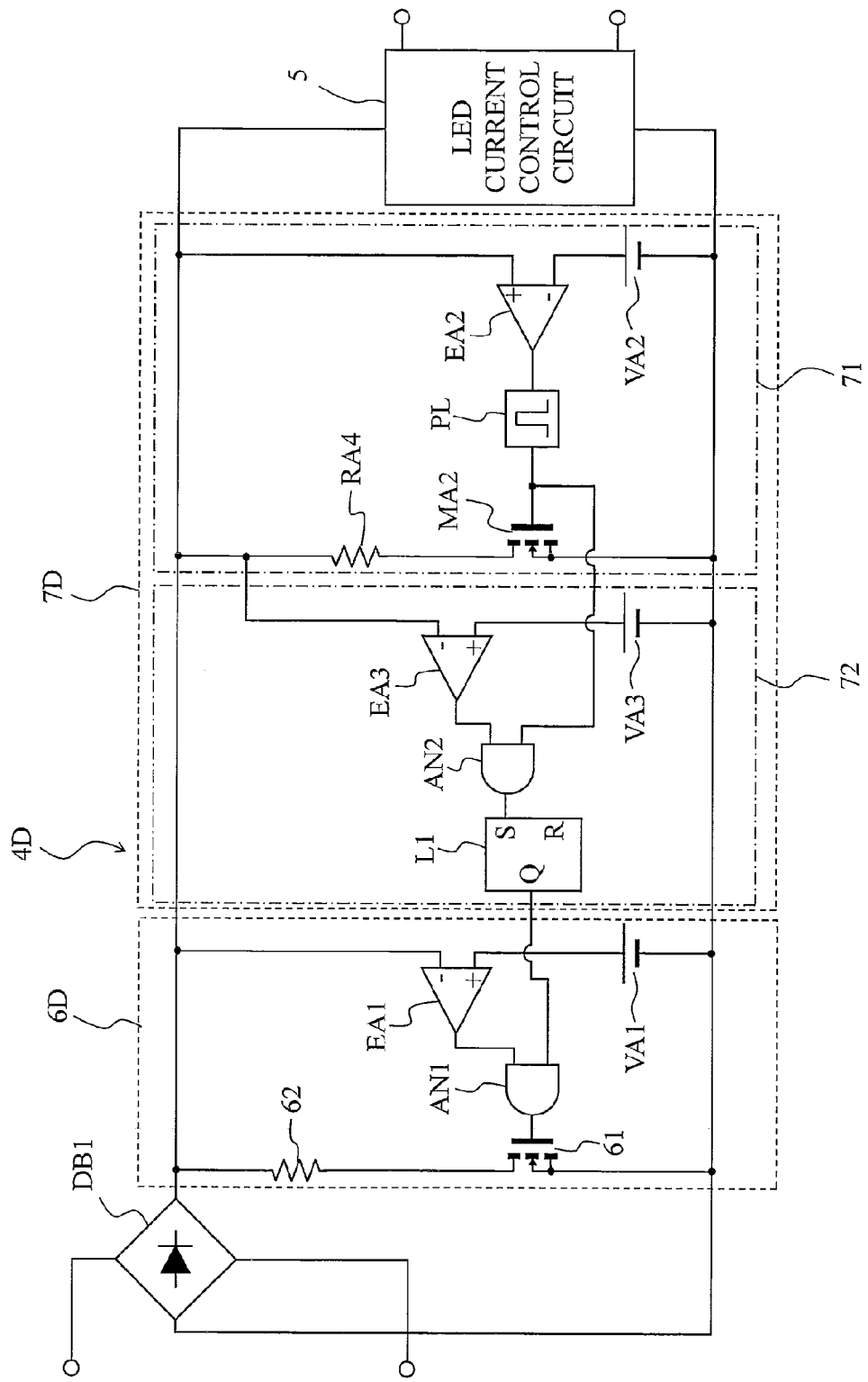
FIG. 6B is a circuit diagram of the LED driving circuit illustrated in FIG. 6A.

A circuit diagram of the further example of the LED driving circuit illustrated in FIG. 6A is illustrated in FIG. 6B. As illustrated in FIG. 6B, the LED driving circuit 4D includes the impedance adjusting section 6D, the current drawing circuit 71, and the impedance detecting circuit 72. As described above, the current drawing circuit 71 and the impedance detecting circuit 72 are included in the impedance detecting section 7D.

The current drawing circuit 71 compares a driver voltage of the LED driving circuit 4D and a voltage of a voltage source VA2. When the driver voltage exceeds the voltage of the voltage source VA2 (for example, 10 V), a comparator EA2 outputs a HIGH signal. The output signal from the comparator EA2 is input to a pulse circuit PL. The pulse circuit PL is a circuit for outputting the HIGH signal over a predetermined period of time when the input signal changes from LOW to HIGH. In the current drawing circuit 71, the pulse circuit PL outputs the HIGH signal in a moment (during a short period of time, for example, about 200 µs) in which the input signal changes from LOW to HIGH. That is, the current drawing circuit 71 draws the current through a resistor RA4 in a moment in which the driver voltage exceeds the voltage of the voltage source VA2.

The impedance detecting circuit 72 includes a latch circuit L1 and an AND circuit AN2. A signal indicating an impedance value from a comparator EA3 and a pulse signal from the pulse circuit PL are input to the AND circuit AN2. An output from the AND circuit AN2 is input to a set terminal of the latch circuit L1.

When the impedance of the LED driving circuit 4D is high, the voltage to be input to an inversion input terminal of the comparator EA3 decreases to be lower than a voltage of a voltage source VA3. As a result, a HIGH signal is output from the comparator EA3. On the other hand, if the impedance of the LED driving circuit 4D is low when the current is drawn by the current drawing circuit 71, the voltage to be input to the inversion input terminal of the comparator EA3 does not decrease and becomes higher than the voltage of the voltage source VA3. As a result, a LOW signal is output from the comparator EA3.

In the impedance detecting circuit 72, if the impedance of the LED driving circuit 4D is high when the current is drawn by the current drawing circuit 71 (during the period of time in which the pulse circuit PL outputs the HIGH signal), the signal from the pulse circuit PL and the signal from the comparator EA3 both become HIGH signals. As a result, a HIGH signal is output from the AND circuit AN2. The HIGH signal output from the AND circuit AN2 is transmitted to the set terminal of the latch circuit L1. Then, a HIGH signal is output from the latch circuit L1. On the contrary, if the impedance of the LED driving circuit 4D is low when the current is drawn from the current drawing circuit 71, the LOW signal is output from the comparator EA3. Therefore, the HIGH signal is not output from the latch circuit L1.

That is, in the LED driving circuit 4D, if the impedance of the LED driving circuit 4D is high (the driver voltage of the LED driving circuit 4D is low) when the current is drawn, the n-type MOSFET 61 of the impedance adjusting section 6D is turned ON to adjust (reduce) the impedance. On the contrary, if the impedance of the LED driving circuit 4D is low (the driver voltage of the LED driving circuit 4D is high) when the current is drawn, the n-type MOSFET 61 of the impedance adjusting section 6D is not turned ON. Note that, the latch circuit L1 is reset when the driver voltage of the LED driving circuit 4D becomes 0V. The latch circuit L1 is reset in accordance with a period of the alternating current.

Figure 6C:
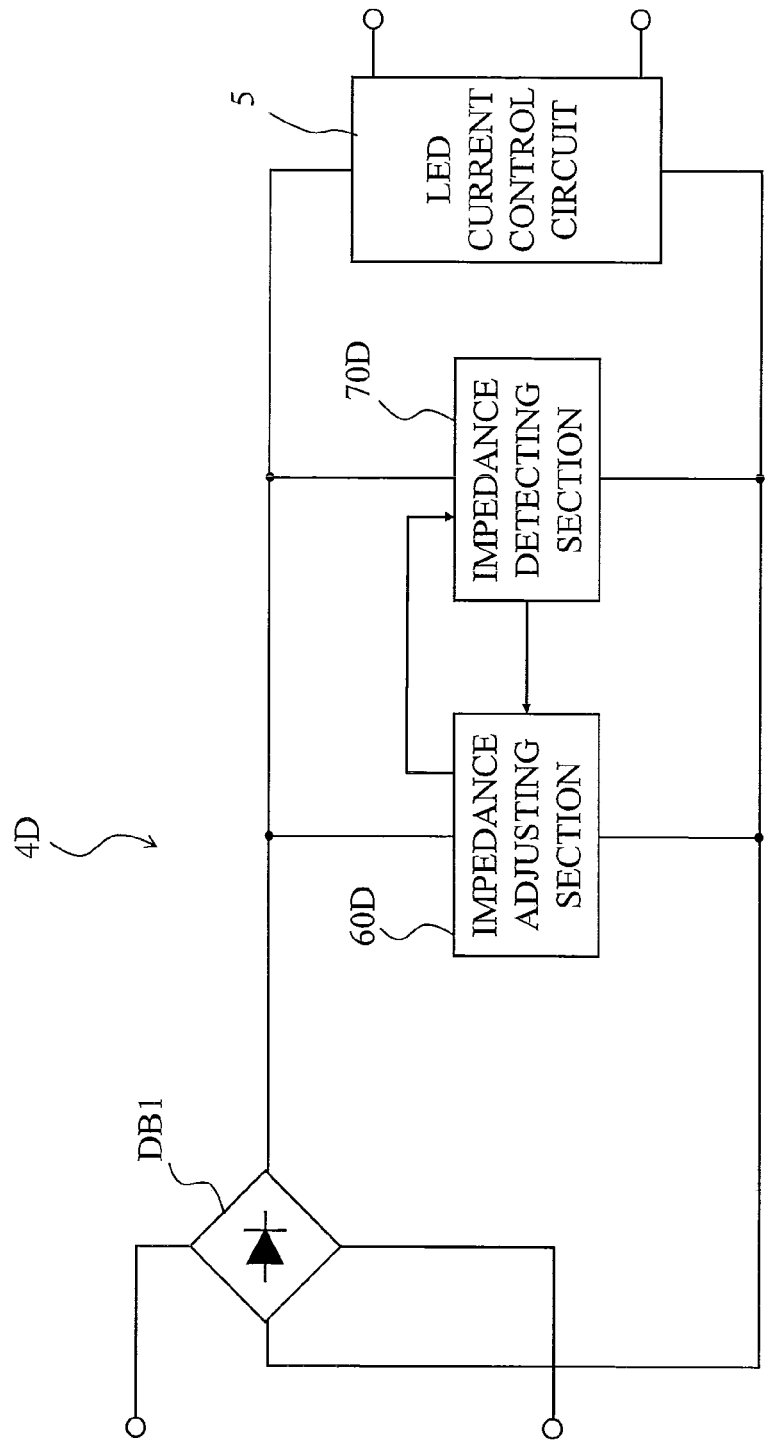
FIG. 6C is a diagram illustrating a modification of the LED driving circuit illustrated in FIG. 6A.

As illustrated in FIG. 6C, the LED driving circuit 40D may include an impedance adjusting section 60D and an impedance detecting section 70D. As illustrated in FIG. 6C, the LED driving circuit 40D has a configuration in which the impedance detecting section 70D is capable of detecting an impedance value of the impedance adjusting section 60D. The impedance adjusting section 60D is operable so as to adjust (reduce) the impedance within a short period of time (200 μs) to allow the current to flow therethrough. The impedance detecting section 70D detects the impedance value when the impedance adjusting section 60D adjusts the impedance within the short period of time, and adjusts (reduces) the impedance of the impedance adjusting section 60D based on the detected impedance value.

Figure 6D:
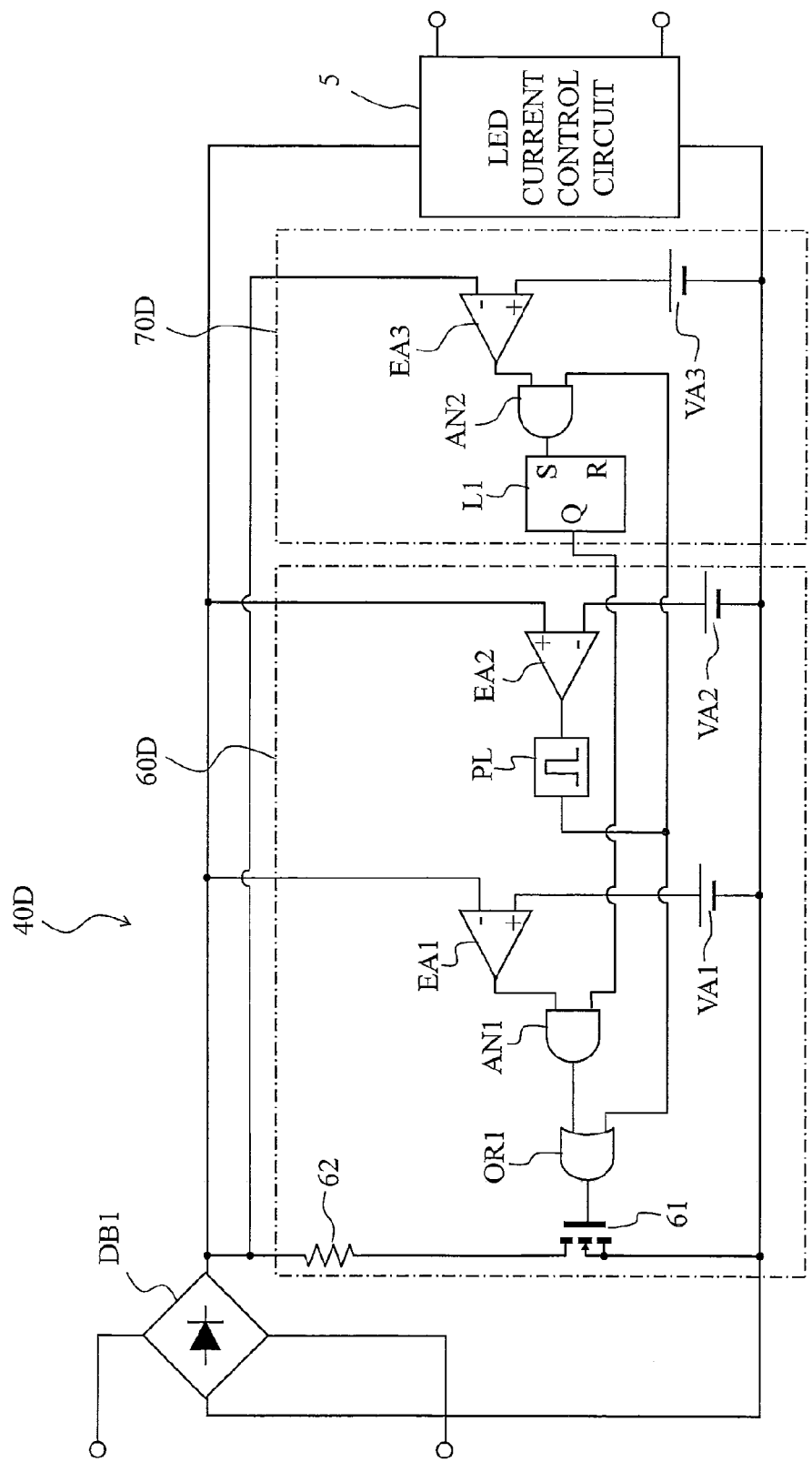
FIG. 6D is a circuit diagram illustrating the LED driving circuit illustrated in FIG. 6C.

A circuit diagram of the example of the LED driving circuit illustrated in FIG. 6C is illustrated in FIG. 6D. A part of the impedance adjusting circuit, that is, the resistor 62 and the n-type MOSFET 61 of the LED driving circuit 4D illustrated in FIG. 6B is used as a part of the current drawing circuit in the LED driving circuit 40D illustrated in FIG. 6D. The LED driving circuit 40D includes an OR circuit OR1 for inputting the signals from the current drawing circuit and the impedance detecting section 70D so as to turn ON the n-type MOSFET 61 by the signal from the impedance detecting section 70D or the output signal of the pulse circuit PL. The n-type MOSFET 61 is turned ON when any one of the current drawing circuit and the impedance detecting section 70D is HIGH. Note that, the current drawing circuit and the current detecting circuit have the same configuration, and therefore the detailed description thereof is herein omitted.

As in the configuration illustrated in FIGS. 6A and 6B, in the configuration of the LED driving circuit 40D, the impedance adjusting section 60D adjusts the impedance based on the adjustment signal from the impedance detecting section 70D. Therefore, the dimming can be stabilized, while an unnecessary power loss can be reduced.

(Eighth Embodiment)

Figure 7:
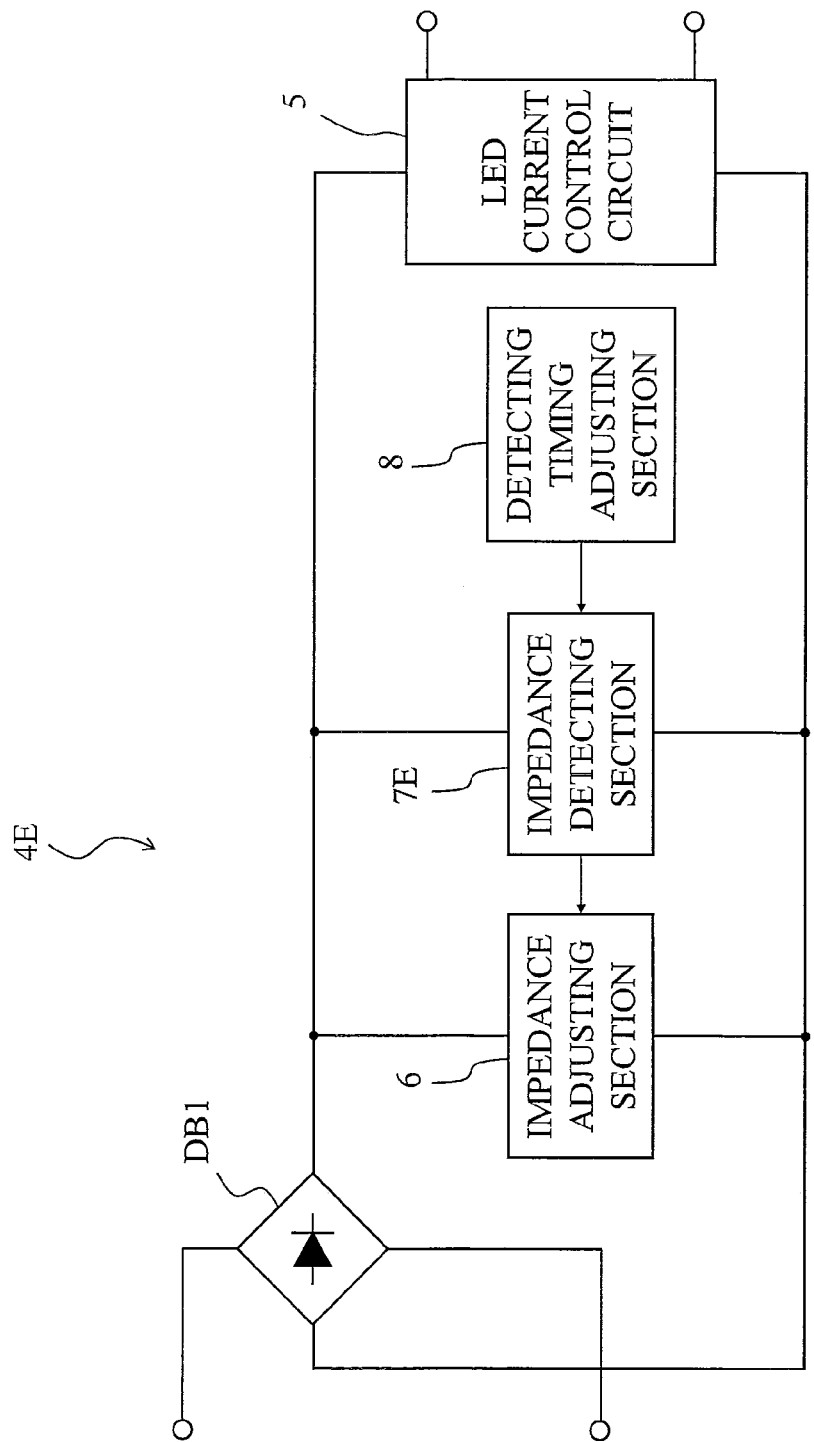
FIG. 7 is a diagram illustrating a further example of the LED driving circuit according to the present invention.

FIG. 7 is a diagram illustrating a further example of the LED driving circuit according to the present invention. Note that, the same parts as those illustrated in FIG. 1 are denoted by the same reference symbols in FIG. 7, and the detailed description thereof is herein omitted. An LED driving circuit 4E illustrated in FIG. 7 includes a detection timing adjusting section 8 for controlling a timing of impedance detection by an impedance detecting section 7E.

The detection timing adjusting section 8 illustrated in FIG. 7 transmits a detection start signal to the impedance detecting section 7E after a predetermined period of time has elapsed since the phase-control type dimmer 2 was turned ON. Upon receiving the detection start signal, the impedance detecting section 7E starts detecting the impedance of the phase-control type dimmer 2.

For example, in the LED illumination system in which the LED illumination appliances L1, L2, and L3 are connected as illustrated in FIG. 2A, each of the LED illumination appliances L1, L2, and L3 includes the LED driving circuit 4. The LED driving circuit 4 includes the impedance detecting section 7. The impedance detecting section 7 determines, based on the detected impedance value, whether or not the impedance is adjusted (reduced) in the impedance adjusting section 6 included in another one of the LED illumination appliances, and adjusts (reduces) the impedance in the impedance adjusting section 6 as needed.

In the LED illumination system, the impedance adjustment (reduction) is performed in any one of the LED illumination appliances. In this configuration, in the case where the impedance is adjusted (reduced) in the another one of the LED illumination appliances when the impedance is to be detected in the impedance detecting section 7E, the impedance adjustment (reduction) can be performed in the single LED illumination appliance alone.

However, in the case where at least two LED illumination appliances are simultaneously lighted and the impedance values are simultaneously detected in the impedance detecting sections 7 provided to the different LED illumination appliances, each of the impedance detecting sections 7 cannot detect that the impedance adjustment (reduction) is performed. Therefore, the impedance is adjusted (reduced) in the impedance adjusting sections 6 respectively included in the LED illumination appliances. As a result, the current disadvantageously flows through the impedance adjusting sections 6 respectively included in the LED illumination appliances. Thus, it becomes difficult to reduce an unnecessary loss current.

To cope with the above-mentioned problem, the LED driving circuit 4E is provided to each of the LED illumination appliances L1, L2, and L3 so that the respective impedance detection start timings of the impedance detecting sections 7E of the LED illumination appliances L1, L2, and L3 are shifted from each other. For example, through shifting, for each of the LED illumination appliances L1, L2, and L3, of a timing of transmission of the detection start signal transmitted from the detection timing adjusting section 8 of the LED driving circuit 4E, the impedance detection start timings can be shifted from each other.

Figure 8A:
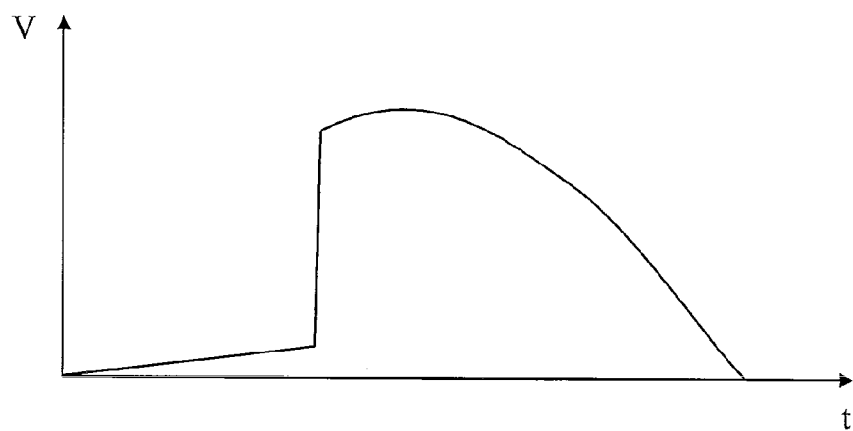
FIG. 8A is a graph showing a variation of a voltage output from a phase-control type dimmer over time.
Figure 8B:
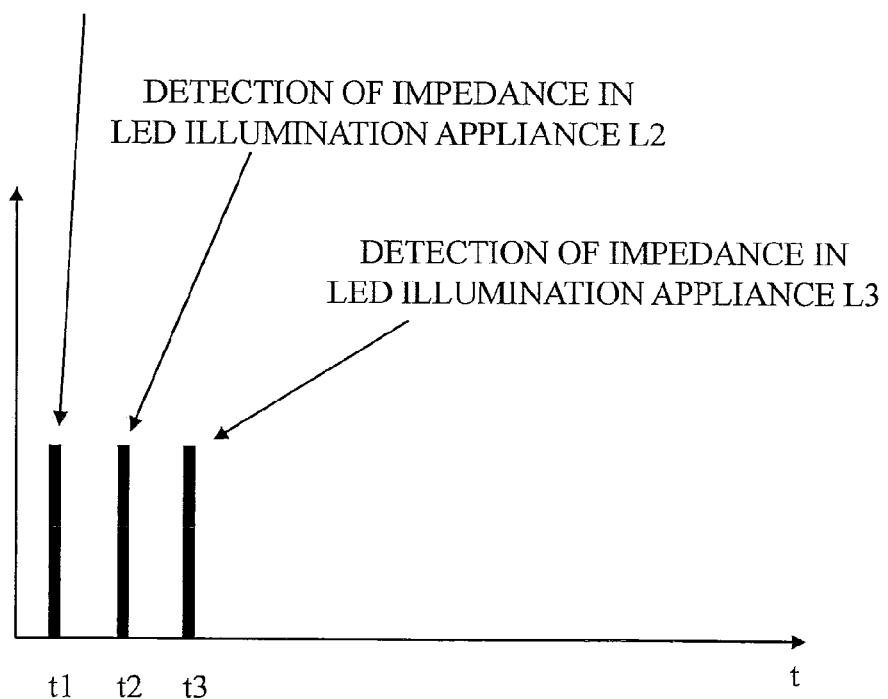
FIG. 8B is a chart showing timings of detection start signals transmitted from detection timing adjusting sections of LED illumination appliances to impedance detecting sections.

The shift of impedance detection start timings described above is specifically described referring to the drawings. FIG. 8A is a graph showing a variation in voltage output from the phase-control type dimmer over time, and FIG. 8B is a chart showing timings of the detection start signals transmitted from the detection timing adjusting sections of the LED illumination appliances to the impedance detecting sections. The timing of transmission of the detection start signal from the detection timing adjusting section 8 to the impedance detecting section 7E is set at a time t1 after a reference time (for example, lighting-operation start time) in the LED illumination appliance L1, a time t2 after the reference time in the LED illumination appliance L2, and a time t3 after the reference time in the LED illumination appliance L3 (t1<t2<t3). Note that, the times t1, t2, and t3 are before the voltage of each of the LED driving circuits suddenly increases, specifically, before the phase-control type dimmer 2 is turned ON.

When the LED illumination appliances L1, L2, and L3 are simultaneously lighted, the LED driving current is simultaneously supplied to all the LED illumination appliances L1, L2, and L3 from the phase-control type dimmer 2 as illustrated in FIG. 8A. At this time, as illustrated in FIG. 8B, before the current is supplied from the phase-control type dimmer 2 (at time t1), the detection start signal is transmitted from the detection timing adjusting section 8 to the impedance detecting section 7E in the LED illumination appliance L1. In the LED illumination appliance L1, the impedance detecting section 7E detects the impedance of the phase-control type dimmer 2. At this time, the impedance is not adjusted (reduced) in the LED illumination appliances L2 and L3. Therefore, the impedance detecting section 7E transmits the adjustment signal to the impedance adjusting section 6. In response to the adjustment signal, the impedance adjusting section 6 performs the impedance adjustment (reduction). In this manner, the impedance is adjusted (reduced) in the LED illumination appliance L1.

On the other hand, in the LED illumination appliances L2 and L3, the impedance detection timings are after the impedance detection timing of the LED illumination appliance L1 (times t2 and t3). Therefore, the impedance is detected after the impedance adjustment (reduction) is performed in the LED illumination appliance L1. In this manner, in the LED illumination appliances L2 and L3, the impedance detecting sections 7E determine that the impedance is already adjusted (reduced) in the LED illumination appliance L1, and therefore do not transmit the adjustment signal. That is, the impedance adjustment (reduction) is not performed. In this manner, even when the pluralities of LED illumination appliances are simultaneously lighted, the dimming can be stabilized, while unnecessary loss power can be reduced.

Note that, in the above-mentioned example, the detection timing adjusting section 8 of the LED driving circuit 4E transmits the detection start signal at the predetermined timing. However, the timing of transmission of the detection start signal may be arbitrarily set. In this case, the detection start timing (time) may be freely set or may be selected from predetermined timings (times). Moreover, in the case where the pluralities of LED illumination appliances are connected, one of the LED illumination appliances may include the LED driving circuit without the detection timing adjusting section 8 (for example, the LED driving circuit 4). The impedance detecting section detects the impedance simultaneously with the turning-ON of the phase-control type dimmer 2 because the detection timing adjusting section 8 is not provided. Therefore, the impedance detection is started at an earlier timing than that (those) of the LED illumination appliance(s) including the detection timing adjusting section 8. Therefore, the impedance detection is not performed at the same time.

(Ninth Embodiment)

FIG. 9 is a diagram illustrating a further example of the LED driving circuit according to the present invention. Note that, the same parts as those illustrated in FIG. 1 are denoted by the same reference symbols in FIG. 9, and the detailed description thereof is herein omitted. An LED driving circuit 4F illustrated in FIG. 9 includes an impedance detecting section 7F.

As illustrated in FIG. 9, the LED driving circuit 4F includes an output hold circuit 81. The impedance detecting section 7F determines, based on the detected impedance value, whether or not the impedance is required to be adjusted (reduced), and transmits a signal indicating the determination result to the output hold circuit 81. In response to the signal output from the impedance detecting section 7F, the output hold circuit 81 transmits the adjustment signal to the impedance adjusting section 6 when the impedance adjustment (reduction) is required. The output hold circuit 81 functions to hold the adjustment signal, and therefore continues transmitting the same adjustment signal even when a signal is not input from the impedance detecting section 7F. The adjustment signal is held until the power source for the LED illumination appliance is turned OFF, that is, the phase-control type dimmer 2 is turned OFF.

When the impedance adjustment (reduction) is not required, the output hold circuit 81 does not transmit the adjustment signal. The output hold circuit 81 maintains the state (halt state) in which the adjustment signal is not transmitted even when the signal is not input from the impedance detecting section 72.

As described above, with the provision of the output hold circuit 81, one-time detection of the impedance is sufficient for the impedance detecting section 7F. As a result, consumption of the current required for the detection of the impedance can be reduced so as to reduce an unnecessary power loss.

Alternatively, the impedance detecting section 7F may periodically detect the impedance and transmit the detected impedance to the output hold circuit 81 so that the output hold circuit 81 changes the adjustment signal based on the transmitted signal. In this manner, the impedance value obtained by the adjustment in the impedance adjusting section 6 can be made appropriate. As a result, the stability of the dimming can be enhanced.

The embodiments of the present invention have been described above, but the scope of the present invention is not limited thereto, and various modifications may be made thereto without departing from the gist of the present invention.

(LED Illumination Appliance According to the Present Invention)

Figure 10:
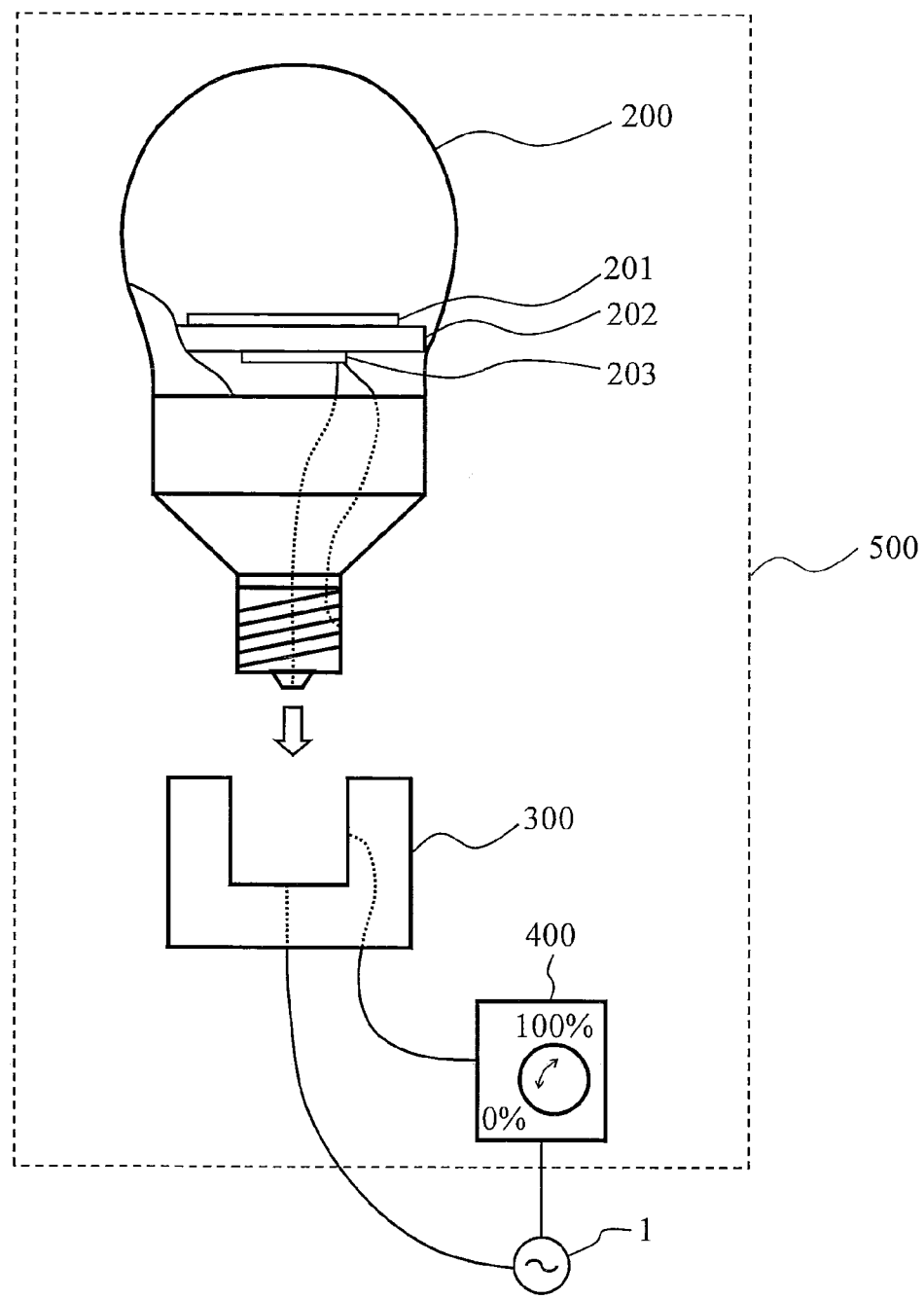
FIG. 10 is a schematic diagram of an LED illumination appliance according to the present invention, an LED illuminator according to the present invention, and an LED illumination system according to the present invention.

A schematic configuration of an LED illumination appliance according to the present invention is described. FIG. 10 is a schematic view of the LED illumination appliance according to the present invention, an LED illuminator according to the present invention, and an LED illumination system according to the present invention. FIG. 10 illustrates an LED illumination appliance 200 of a bulb type according to the present invention in a partially cutaway view. The LED illumination appliance 200 of a bulb type according to the present invention, illustrated in FIG. 10, includes a case or substrate 202, an LED module 201, and a circuit 203 therein. The LED module 201 includes one or more LED(s) provided on a front surface of the case or substrate 202 (on the top side of the bulb). The circuit 203 is provided on a back surface of the case or substrate 202 (on the lower side of the bulb). As the circuit 203, each of the above-mentioned examples of the LED driving circuit according to the present invention can be used. Note that, the circuit 203 is not limited to each of the above-mentioned examples of the LED driving circuit according to the present invention. It should be understood that any circuit configuration including at least a circuit for detecting the impedance of the phase-control type dimmer 2 to adjust (reduce) the impedance based on the detected impedance value may be used as the circuit 203.

An LED illumination-appliance mounting portion 300 and a light controller (phase-control type dimmer) 400 are connected in series to the AC power source 1. The LED illumination appliance 200 of a bulb type according to the present invention is screwed into the LED illumination-appliance mounting portion 300. The LED illumination appliance 200 of a bulb type according to the present invention and the LED illumination-appliance mounting portion 300 form an LED illuminator (a ceiling light, a pendant light, a kitchen light, a downlight, a standing light, a spotlight, a footlight or the like). Then, the LED illumination appliance 200 of a bulb type according to the present invention, the LED illumination-appliance mounting portion 300, and the light controller 400 form an LED illumination system 500 according to the present invention. The LED illumination-appliance mounting portion 300 is provided on, for example, a wall surface of a ceiling of a living room, whereas the light controller 400 is provided on, for example, a side wall surface of the living room.

The LED illumination appliance 200 of a bulb type according to the present invention is mountable/removable to/from the LED illumination-appliance mounting portion 300. Therefore, for example, simply by replacing an illumination appliance such as an incandescent lamp or a fluorescent lamp with the LED illumination appliance 200 of a bulb type according to the present invention in an existing illumination appliance and an existing illumination system which have conventionally used the illumination appliance such as the incandescent lamp or the fluorescent lamp, the dimming performed by the phase-control type dimmer can be stabilized, while an unnecessary loss power can be reduced.

FIG. 10 illustrates an outward appearance of the light controller 400 in the case where the light controller 400 is the phase-control type dimmer illustrated in FIG. 1. In this case, the degree of dimming can be changed with a dial-type volume controller. It should be understood that a slide-type volume controller may be used to change the degree of dimming in place of the dial-type one.

Moreover, in the above description, the light controller 400 is directly operated by a user with the dial-type volume controller or the slide-type volume controller. However, the light controller 400 is not limited thereto. The light controller 400 may be remotely operated by the user with a wireless signal from a remote controller or the like. Specifically, a wireless-signal receiving section may be provided to the light controller main body serving as a reception side, whereas a wireless-signal transmitting section for transmitting a light-control signal (for example, a dimming signal, a light ON/OFF signal or the like) to the wireless-signal receiving section may be provided to a transmitter main body (for example, a remote-control transmitter, a mobile terminal or the like) serving as a transmission side. In this manner, a remote operation is enabled.

Figure 11:
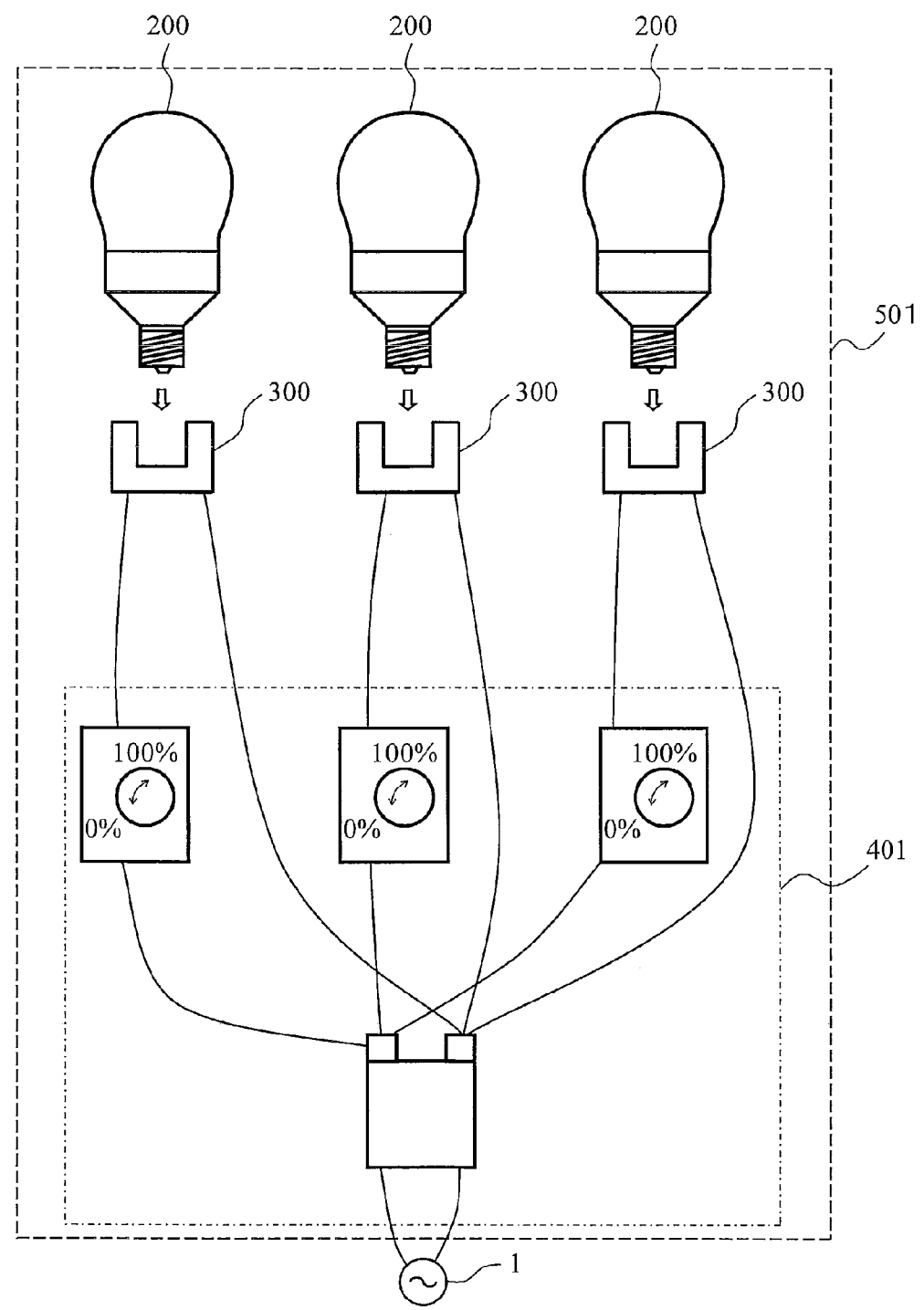
FIG. 11 is a schematic diagram illustrating another example of the LED illumination system according to the present invention.

A schematic configuration of another example of the LED illumination system according to the present invention is described. FIG. 11 is a schematic diagram of the LED illumination system according to the present invention. As illustrated in FIG. 11, an LED illumination system 501 includes three LED illumination appliances 200, three LED illumination-appliance mounting portions 300, and one light controller 401.

The light controller 401 is connected to the AC power source 1, while the three LED illumination-appliance mounting portions 300 are connected in parallel to the light controller 401. The light controller 401 can supply a current to each of the LED illumination-appliance mounting portions 300 from the AC power source 1. In the light controller 401, the dimming is performed in each of the LED illumination-appliance mounting portions 300 by one phase-control type dimmer. Note that, although not shown, the light controller 401 is configured so that the dimming can be performed for each of the LED illumination-appliance mounting portions 300.

The LED illumination appliance 200 is mounted to each of the three LED illumination-appliance mounting portions 300. Then, each of the LED illumination appliances 200 can stabilize the dimming performed by the phase-control type dimmer and reduce an unnecessary power loss through operation of the circuit 203 included inside the LED illumination appliance 200. It should be understood that the number of the LED illumination-appliance mounting portions 300 is not limited to three. Further, as long as the LED illumination appliance 200 is mounted to at least one of the LED illumination-appliance mounting portions 300 in the LED illumination system 501, an existing illumination appliance such as an incandescent lamp or a fluorescent lamp may be mounted to each of the remaining LED illumination-appliance mounting portion(s) 300.

The LED illumination appliance described above according to the present invention is a bulb-type LED illumination appliance, but the LED illumination appliance of the present invention is not limited thereto. For example, as illustrated in FIG. 12, a lamp-type LED illumination appliance 600, a ring-shaped LED illumination appliance 700, or a straight-tube type LED illumination appliance 800 may be used. In the LED illumination appliance having any of those shapes, the LED illumination appliance includes, therein, at least an LED and a circuit for detecting the impedance of the phase-control type dimmer 2 and adjusting (reducing) the impedance based on the detected impedance value.

What is claimed is:

1. An LED driving circuit connectable to a phase-control type dimmer, for inputting an alternating voltage to drive an LED, the LED driving circuit comprising:
impedance detecting means for detecting an impedance value of the phase-control type dimmer;
impedance adjusting means for adjusting an impedance of the LED driving circuit based on the impedance value detected by the impedance detecting means; and
a current detecting means for detecting a current value of a current flowing through the impedance adjusting means;
wherein the impedance detecting means outputs an adjustment signal for adjusting the impedance to the impedance adjusting means,
the adjustment signal comprises a signal indicating the impedance value detected by the impedance detecting means; and
the impedance adjusting means determines an adjusted impedance value based on the adjustment signal and the detected current value, detected by the current detecting means of the current flowing through the impedance adjusting means.

2. The LED driving circuit according to claim 1, wherein:
the impedance detecting means stops detecting the impedance after a predetermined period of time; and
the LED driving circuit further comprises holding means for holding the output of the adjustment signal even after the stop of the detection of the impedance by the impedance detecting means.

3. The LED driving circuit according to claim 1, wherein:
pluralities of illumination appliances are connectable to the phase-control type dimmer; and
the impedance detecting means determines, based on the detected impedance value, whether or not another one of the pluralities of illumination appliances is connected to the phase-control type dimmer.

4. The LED driving circuit according to claim 3, wherein:
the impedance detecting means has a configuration allowing a current to flow therethrough; and
the impedance detecting means allows the current to flow therethrough when the phase-control type dimmer is in an OFF state, and detects the impedance value based on a variation in a current value of the current.

5. The LED driving circuit according to claim 3, wherein the impedance detecting means varies an impedance adjustment amount of the impedance adjusting means for a predetermined period of time when the phase-control type dimmer is in an OFF state, and detects the impedance value based on a variation in a current value caused thereby.

6. The LED driving circuit according to claim 3, wherein:
when the impedance detecting means determines that the pluralities of illumination appliances are connected to the phase-control type dimmer, the impedance detecting means determines, based on the detected impedance value, whether or not the impedance is adjusted in another one of the pluralities of illumination appliances connected to the phase-control type dimmer; and
when the impedance detecting means determines that the impedance is not adjusted in another one of the pluralities of illumination appliances, the impedance adjusting means adjusts the impedance.

7. The LED driving circuit according to claim 1, wherein the impedance adjusting means adjusts the impedance of the LED driving circuit at least when the phase-control type dimmer is in an OFF state.

8. The LED driving circuit according to claim 1, wherein the impedance adjusting means adjusts the impedance at least for a predetermined period of time after the phase-control type dimmer is turned ON.

9. The LED driving circuit according to claim 1, wherein the impedance adjusting means adjusts the impedance at least when the phase-control type dimmer performs dimming to a low brightness.

10. The LED illumination appliance, comprising:
the LED driving circuit according to claim 1; and
an LED connected to an output side of the LED driving circuit.

11. The LED illuminator, comprising pluralities of illumination appliances,
wherein at least one of the pluralities of illumination appliances comprises the LED illumination appliance according to claim 10.

12. The LED illumination system, comprising:
the LED illuminator according to claim 11; and
a phase-control type dimmer,
wherein input sides of the pluralities of illumination appliances are connected in parallel to an output side of the phase-control type dimmer.

* * * * *